US007559759B2

(12) United States Patent
Vantrease

(10) Patent No.: US 7,559,759 B2
(45) Date of Patent: Jul. 14, 2009

(54) TRIM PRESS HAVING AN ARTICLE EJECTOR, ARTICLE EJECTING DEVICE WITH LINEAR DRIVE MECHANISM, AND METHOD

(75) Inventor: Dale L. Vantrease, Naches, WA (US)

(73) Assignee: Irwin Research and Development, Inc., Yakima, WA (US)

( * ) Notice: Subject to any disclaimer, the term of this patent is extended or adjusted under 35 U.S.C. 154(b) by 578 days.

(21) Appl. No.: 11/186,725

(22) Filed: Jul. 20, 2005

(65) Prior Publication Data
US 2006/0017187 A1  Jan. 26, 2006

Related U.S. Application Data

(60) Provisional application No. 60/589,604, filed on Jul. 20, 2004, provisional application No. 60/606,097, filed on Aug. 30, 2004.

(51) Int. Cl.
B28B 1/00 (2006.01)
(52) U.S. Cl. ...................................... 425/422
(58) Field of Classification Search ................. 74/422; 425/444, 422; 318/560; 83/684, 615; 264/334
See application file for complete search history.

(56) References Cited

U.S. PATENT DOCUMENTS

| 3,990,501 | A |  | 11/1976 | Fisher et al. ............... 164/347 |
| 4,064,928 | A |  | 12/1977 | Wunder ..................... 164/264 |
| 4,313,358 | A |  | 2/1982 | Brown ......................... 83/97 |
| 4,391,171 | A |  | 7/1983 | Wendt ......................... 83/82 |
| 4,548,544 | A |  | 10/1985 | Van Appledorn ............ 414/751 |
| 4,665,785 | A |  | 5/1987 | Thurner ....................... 83/98 |
| 4,752,200 | A |  | 6/1988 | Bartschke ................... 425/139 |
| 4,886,106 | A |  | 12/1989 | Bennett ..................... 164/70.1 |
| 4,919,637 | A | * | 4/1990 | Fleischmann ............... 446/162 |
| 5,122,029 | A |  | 6/1992 | DelDuca ................... 414/789.2 |
| 5,199,340 | A |  | 4/1993 | Lamson ....................... 83/82 |
| 5,234,313 | A |  | 8/1993 | DelDuca ..................... 414/786 |
| 5,249,492 | A |  | 10/1993 | Brown et al. .................. 83/23 |
| 5,266,874 | A | * | 11/1993 | Stillhard ..................... 318/560 |
| 5,544,413 | A |  | 8/1996 | Stevens et al. .......... 29/888.092 |
| 5,648,103 | A | * | 7/1997 | Takanohashi ............... 425/107 |
| 5,753,280 | A | * | 5/1998 | Coxhead ..................... 425/556 |
| 5,875,165 | A | * | 2/1999 | Litsche ....................... 720/645 |
| 6,067,886 | A |  | 5/2000 | Irwin ......................... 83/615 |
| 6,843,156 | B1 |  | 1/2005 | Irwin ......................... 83/228 |
| 2005/0037107 | A1 | * | 2/2005 | Irwin et al. ................. 425/444 |

FOREIGN PATENT DOCUMENTS

EP          1092989 A1 *  4/2001

* cited by examiner

Primary Examiner—Joseph S. Del Sole
Assistant Examiner—David N Brown, II
(74) Attorney, Agent, or Firm—Wells St. John P.S.

(57) ABSTRACT

A trim press article ejector is provided having a support base, a linear actuator, at least one article ejector and a drive mechanism. The linear actuator is carried by the base. The at least one article ejector is carried by the linear actuator for axial movement to-and-fro. The drive mechanism is configured to reciprocate the linear actuator in order to move the at least one article ejector to-and-fro. A method is also provided.

14 Claims, 28 Drawing Sheets

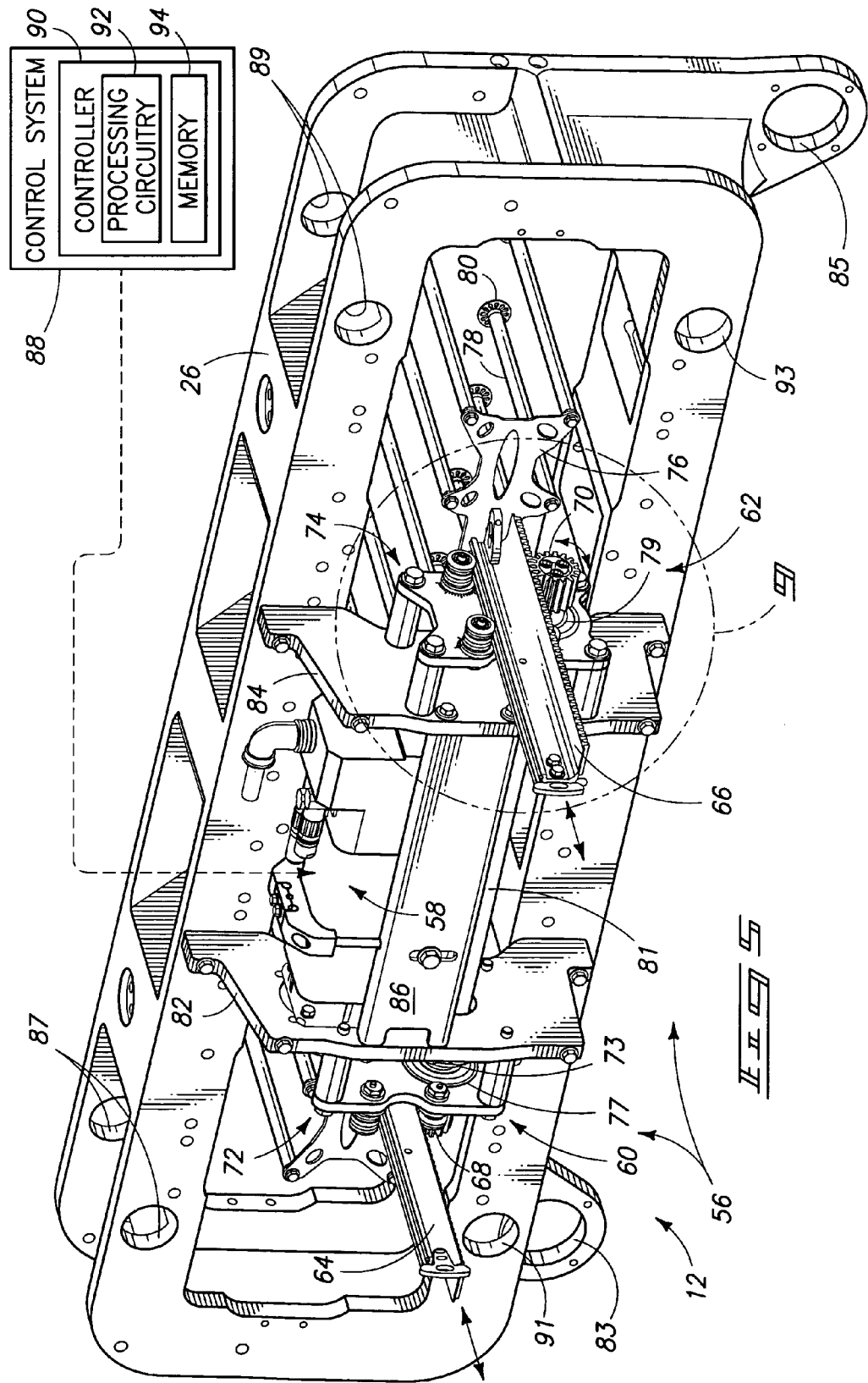

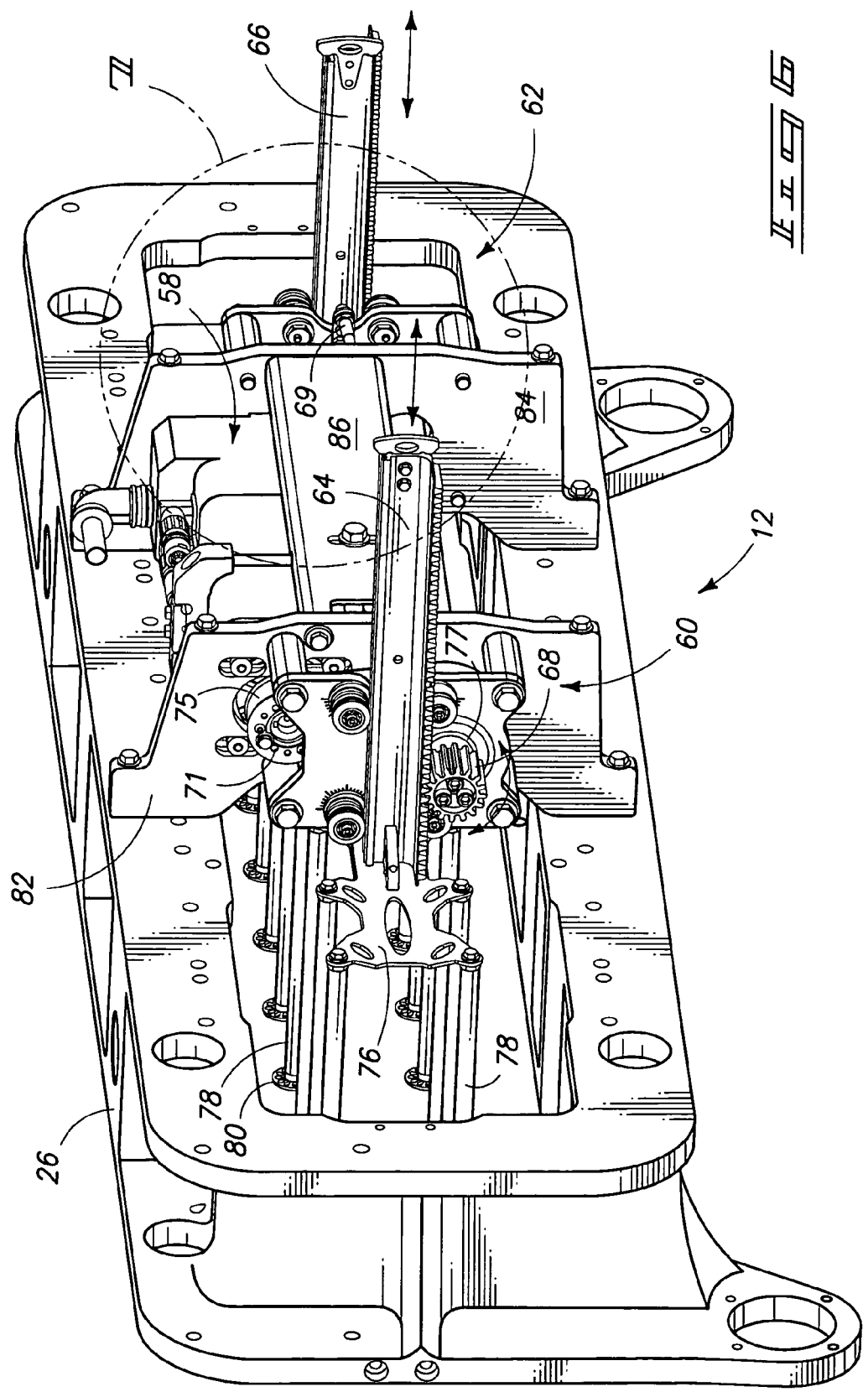

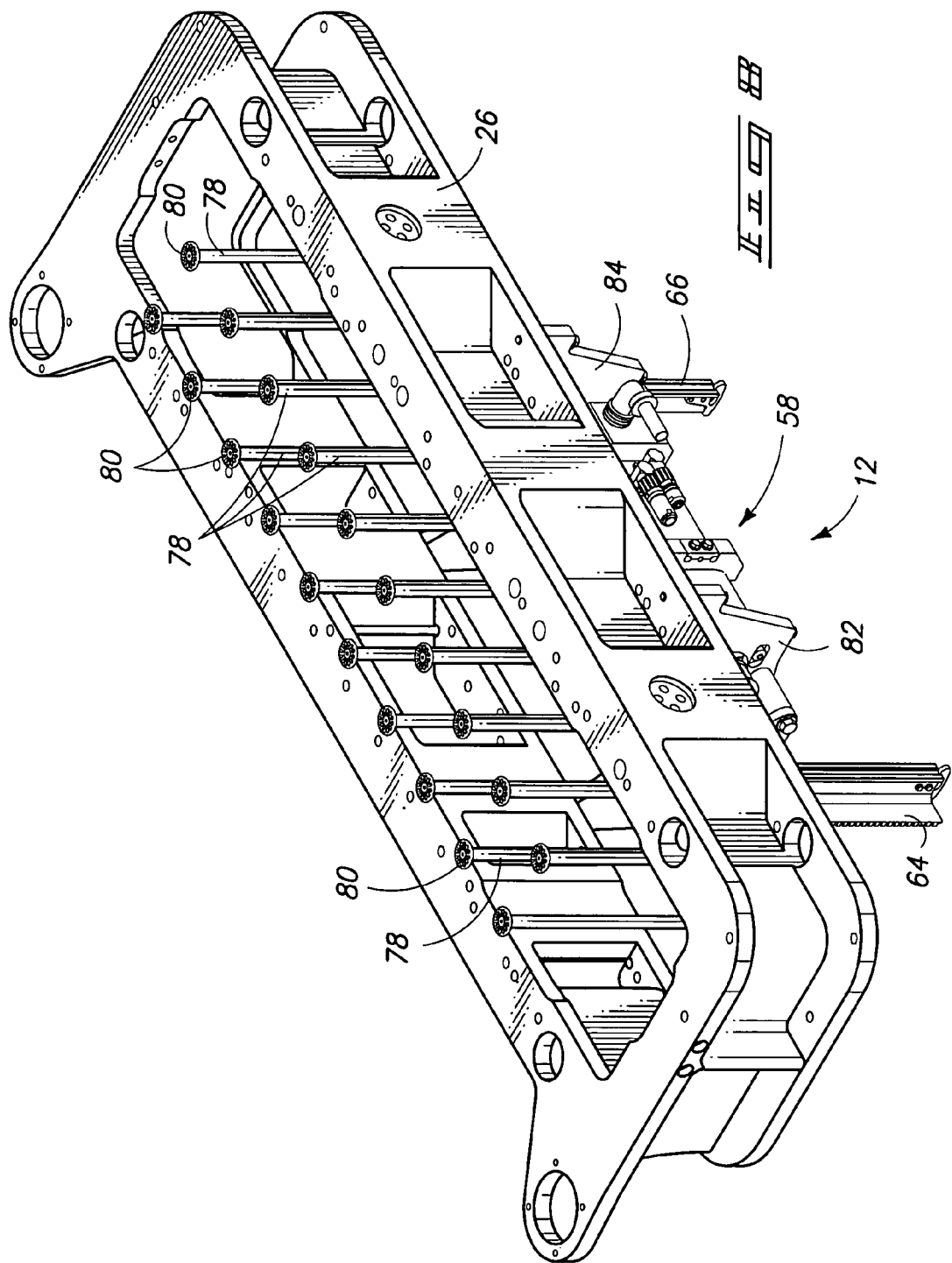

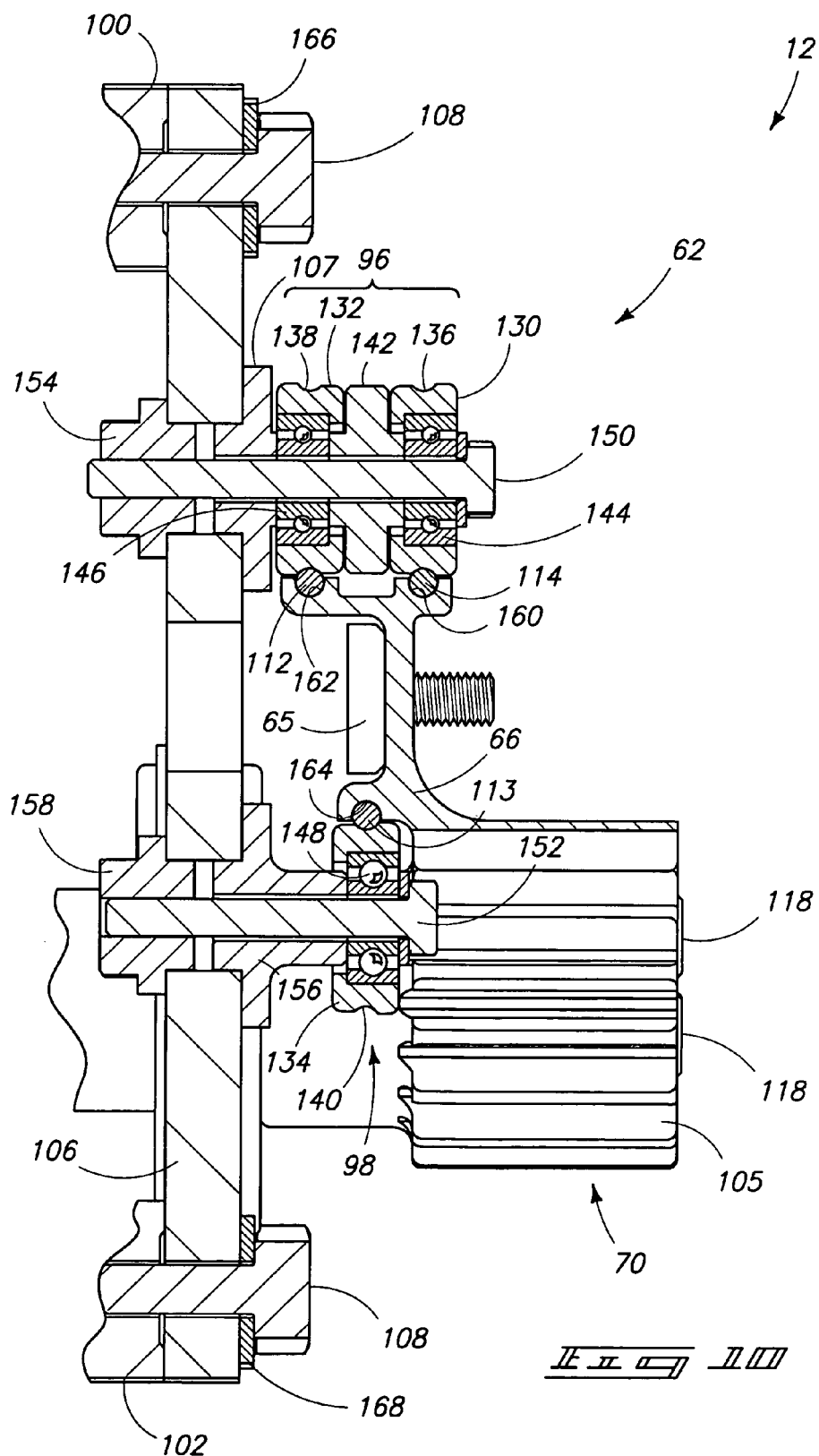

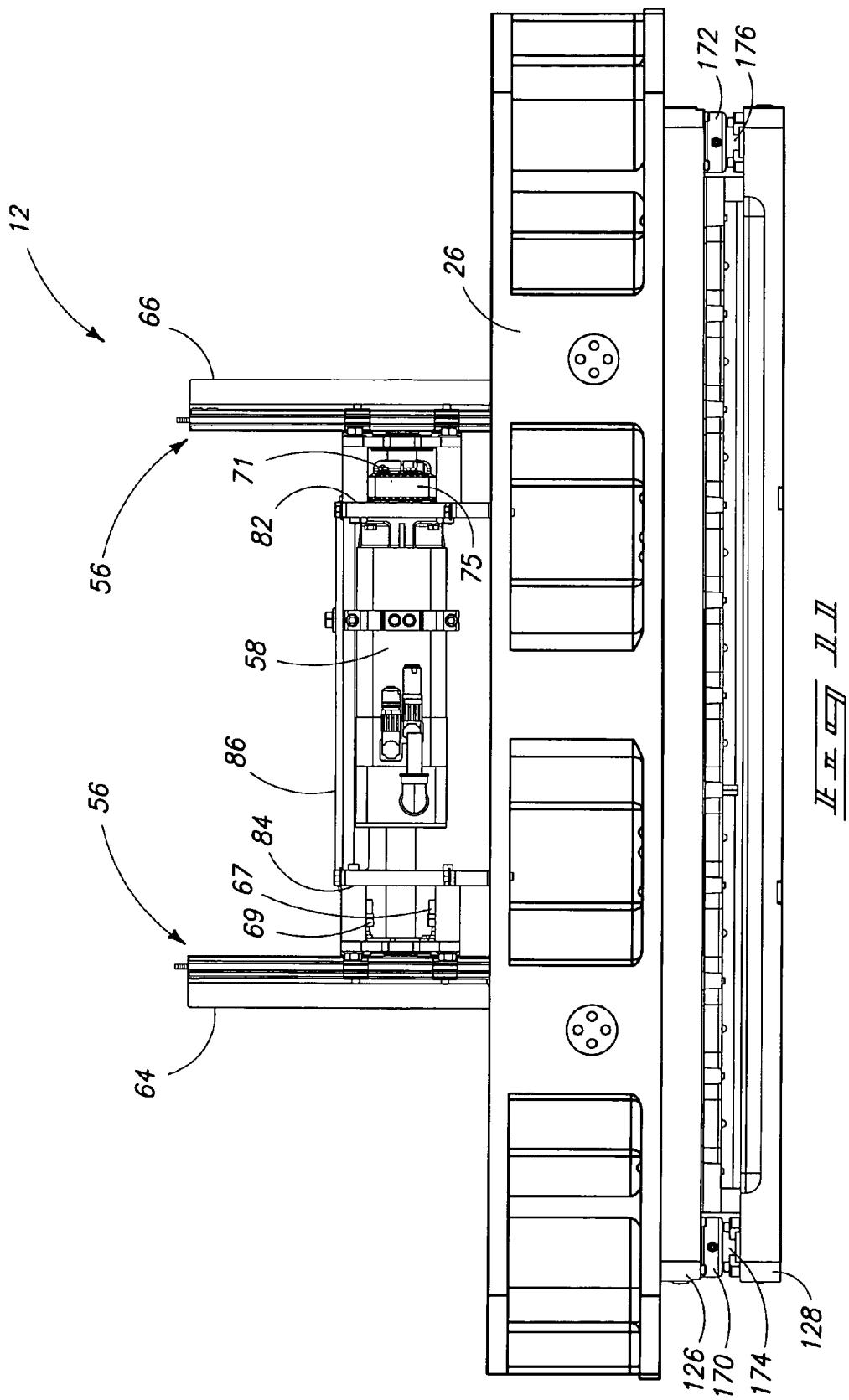

TRIM PRESS HAVING AN ARTICLE EJECTOR, ARTICLE EJECTING DEVICE WITH LINEAR DRIVE MECHANISM, AND METHOD

RELATED PATENT DATA

This application claims priority from U.S. Provisional Patent Application Ser. No. 60/589,604, filed Jul. 20, 2004, and U.S. Provisional Patent Application Ser. No. 60/606,097, filed Aug. 30, 2004, both of which are incorporated by reference herein.

TECHNICAL FIELD

This invention pertains to apparatus and methods for separating and ejecting thin-walled articles from a sheet of material in which the articles have been formed. More particularly, the present invention relates to an article-ejecting apparatus having a linear drive mechanism with a drive motor and control system for separating thin-walled articles from a sheet of plastic material.

BACKGROUND OF THE INVENTION

A number of different techniques are previously known for separating thin-walled thermoformed articles from sheets of thermoformable plastic material. Typically, articles are trimmed from a sheet or web of material and an article ejector is utilized along with co-acting male and female trim dies to advance articles from between the co-acting dies after they have been severed from the sheet or web of material.

A typical thermoforming operation molds articles into a heated material web, such as a sheet of solid or foamed-plastic material. The heated web of material is transported to a thermoforming machine where the articles are formed in the web. The web is then transported from the thermoforming machine at a relatively high operating speed into a trim press where the articles are severed from the web of material. Typically, the trim press includes article ejectors that assist in removing the articles from the web of material and from between a pair of co-acting dies, after severing from the web.

U.S. Pat. No. 4,391,171 discloses a trim press with an article ejector that is mounted on a moving die assembly to separate severed articles from a moving trim die. More particularly, the article ejector is mechanically driven by a drive mechanism comprising a flywheel that also drives the trim press dies. The flywheel drives a rocker arm assembly to-and-fro via a connecting rod to move an ejector plate and ejector pins. However, such a construction uses a series of complicated mechanical linkages which substantially increase the weight of moving components. Furthermore, such a construction utilizes the same flywheel drive mechanism to move the die platens and dies, as well as to move the article ejector. Because the same mechanical drive mechanism is used for driving both components, there is very little time in which to activate the article ejector during a cyclical trim operation. The articles need to be ejected after a trim operation has been implemented, but before a web of material is fed for a subsequent trim operation. Accordingly, there is only a small period of time in a cycle of operation between successive trim operations in order to eject articles. Such limited time means that it is often only possible to run 50 to 60 cycles during a trim operation. Furthermore, the mechanical components are frequently lubricated. Because the mechanical components need to move at an extremely high rate of speed (due to the limited amount of time in which to implement the operation), there is a risk that lubricating grease and oil will become airborne or thrown about which can contaminate articles that are being severed for use in the food industry.

U.S. Pat. No. 5,199,340 illustrates an ejector mechanism having ejector pins moveable relative to a die member via a longitudinally extending ejector bar driven by a trip lever via a toggle linkage mechanism. This ejector mechanism is similar to the previously cited article ejector in that oscillating components are utilized to drive the ejector mechanism, and the main drive mechanism for a trim press is also utilized to drive the ejector mechanism. Hence, the previously recited problems also are encountered by this ejector mechanism.

Accordingly, improvements are needed to overcome the previously recited problems. Furthermore, a smaller overall package size is also desired for an article ejector to accommodate mounting onto trim presses having limited available mounting space for an article ejector.

SUMMARY OF THE INVENTION

An article ejector is provided having a linear drive mechanism that drives ejector pins and ejector pistons to-and-fro using a linear actuator with a computer controlled, servo drive motor. According to one construction, the linear actuator comprises a pair of interacting rack and pinion assemblies, with each rack being guided for axial reciprocation via a rack mounted plate assembly.

According to one aspect, a trim press article ejector is provided with a support base, a linear actuator, at least one article ejector and a drive mechanism. The linear actuator is carried by the base. The at least one article ejector is carried by the linear actuator for axial movement to-and-fro. The drive mechanism is configured to reciprocate the linear actuator in order to move the at least one article ejector to-and-fro.

According to another aspect, a trim press is provided with a frame, a stationary die platen, a moving die platen, and an article ejector. The article ejector has a support base, a linear actuator carried by the support base, at least one article ejector, and a drive mechanism. The article ejector is carried by the linear actuator for movement to-and-fro. The drive mechanism is configured to reciprocate the linear actuator to move the at least one article ejector to-and-fro.

According to yet another aspect, a method is provided for ejecting articles from a die of a thermoforming trim press. The method includes: providing a trim press having an article ejector with a base, a linear actuator, at least one article ejector, and a drive mechanism for reciprocating the linear actuator and the at least one article ejector to-and-fro; detecting axial position of the linear actuator and the at least one article ejector; and responsive to detecting the axial position, controllably actuating the linear actuator and the at least one article ejector to desired positions relative to the base.

One advantage is provided by an article ejector that has relatively lightweight moving components and a relatively small size. Another advantage is provided in that moving components do not require the provision of oil or grease lubrication, as selected moving contact components are typically made from self-lubricating parts, such as polytetrafluoroethylene (Teflon®). A further advantage is provided in that the article ejector is driven by a linear moving apparatus that can be independently operated and controlled relative to the drive motors that drive a trim press. Accordingly, the timing of movements for an article ejector can be independently controlled relative to the motions of trim dies within a trim press.

BRIEF DESCRIPTION OF THE DRAWINGS

Preferred embodiments of the invention are described below with reference to the following accompanying drawings.

FIG. 5 is an enlarged perspective view of the article ejector corresponding substantially to the view taken in FIG. 4 but without remaining portions of the trim press;

FIG. 6 is an enlarged perspective view of the article ejector of FIG. 5, but taken from a view that is right-of-center of the view depicted in FIG. 1;

FIG. 7 is a further enlarged perspective view with parts removed and taken within the encircled region 7 of FIG. 6 to illustrate construction of a linear actuator and position sensors to detect relative position of an ejector platen and rack;

FIG. 8 is an enlarged perspective view of the article ejector of FIGS. 5-7, but taken from an opposite side of that depicted in FIG. 5;

FIG. 10 is an enlarged vertical sectional view taken along line 10-10 of FIG. 9 and illustrating interaction of a pair of rollers on a rack mount plate with a respective rack of the article ejector;

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Reference will now be made to two preferred embodiments of Applicant's invention comprising a trim press with an article ejector having a linear actuator that is driven by a servo motor and a control system. While the invention is described by way of preferred embodiments, it is understood that the description is not intended to limit the invention to such embodiments, but is intended to cover alternatives, equivalents, and modifications which may be broader than the embodiments, but which are included within the scope of the appended claims.

In an effort to prevent obscuring the invention at hand, only details germane to implementing the invention will be described in great detail. Presently understood peripheral details will be incorporated by reference, as needed, as being presently understood in the art.

Figure 1:
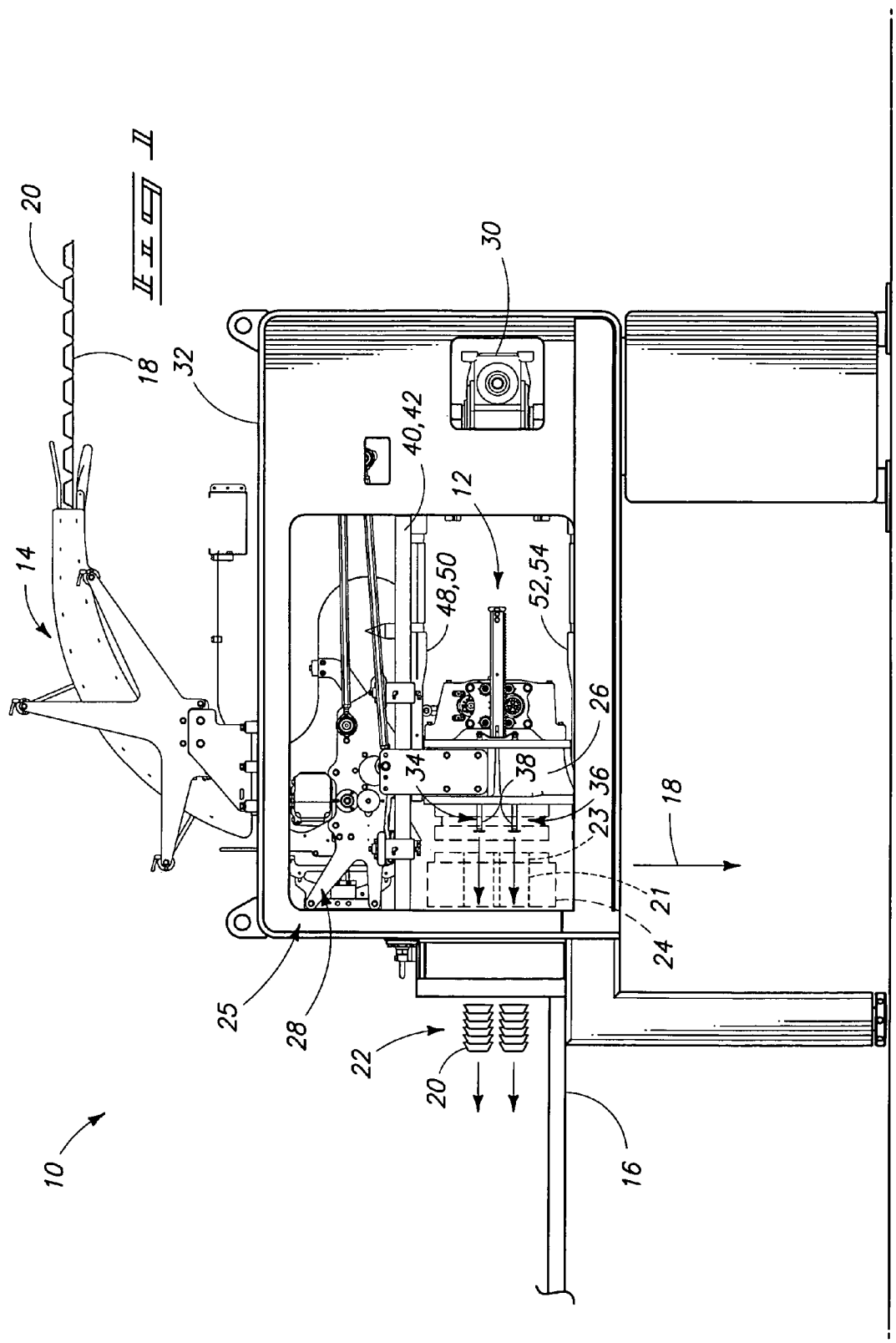
FIG. 1 is a vertical side view of a thermoforming machine trim press having an article ejector of an article ejector apparatus embodying one aspect of the invention.

A first exemplary embodiment of Applicant's invention is shown implemented on a thermoforming machine trim press 10, wherein the invention is generally designated with reference numeral 12 in FIG. 1. An article ejector 12 is mounted onto a backside of a moving platen 26 of trim press 10 for ejecting individual articles 20 from within an article cavity 21 within a female die 23 of a stationary platen 24. Articles 20 are severed from a web 18 of thermoformable plastic material as web 18 is advanced by a web conveyor 25 comprising two sets of co-acting drive rollers provided on opposite edges of web 18 from a first set within an upstream portion of a canopy (not shown) and a second set within a downstream portion of canopy 14, adjacent to a treadle 28. Treadle 28 (partially shown) is configured to advance web 18 and articles 20 into trim press 10 from a thermoforming machine (not shown).

It is understood that a control system choreographs operation of trim press 10 along with web conveyor 25 in order to move web 18 and articles 20 for severing from web 18. In operation, web 18 is driven in intermittent motion under the control of a thermoforming line control system in order to intermittently feed individual rows of articles 20 for severing from web 18 using trim press 10. According to one construction, there are eight articles 20 within a single row of web 18.

Article accumulator 12 is provided on trim press 10 in order to separate severed articles 20 from web 18 into stacks 22 for delivery onto one or more surfaces on a packaging table 16. Stacks 22 of articles 20 exit article cavity 21 in a horizontal direction where they accumulate atop table 16. Typically, stacks 22 are subsequently loaded into individual packages or plastic bags.

As shown in FIG. 1, article ejector 12 is mounted onto a back surface of moving platen 26. A drive motor and gearbox assembly 30 drives moving platen 26 to-and-fro along a horizontal plane to successively sever two adjacent rows of articles 20 within web 18 during each cycle of moving platen 26. Web 20 is advanced incrementally two rows between each forward stroke of moving platen 26.

Drive motor and gear box assembly 30 are rigidly mounted onto a frame 32. According to one construction, rows 34 and 36 on article ejector 12 include eight ejector pin assemblies 38 arranged in a horizontal row.

Drive motor and gear box assembly 30 cooperate to drive moving platen 26 in horizontal reciprocation to-and-fro by way of upper platen connecting rods 48 and 50, as well as lower platen connecting rods 52 and 54. Rods 48, 50 and 52, 54 are driven by four counterbalanced crank arm assemblies (not numbered), as described in U.S. Pat. No. 6,067,886, incorporated by reference herein. Reciprocation of platen 26 causes co-action of male and female dies about a web to sever articles therefrom.

Reciprocation of moving platen 26 also drives a kinematic linkage that concurrently moves treadle 28 horizontally to-and-fro according to a construction described in U.S. Pat. No. 6,843,156, also incorporated by reference herein. Treadle 28 is further guided for axial reciprocation by a pair of treadle die posts 40 and 42. Likewise, moving platen 26 is further guided for horizontal linear reciprocation by a pair of platen die posts 44 and 46 (see FIG. 2).

Figure 2:
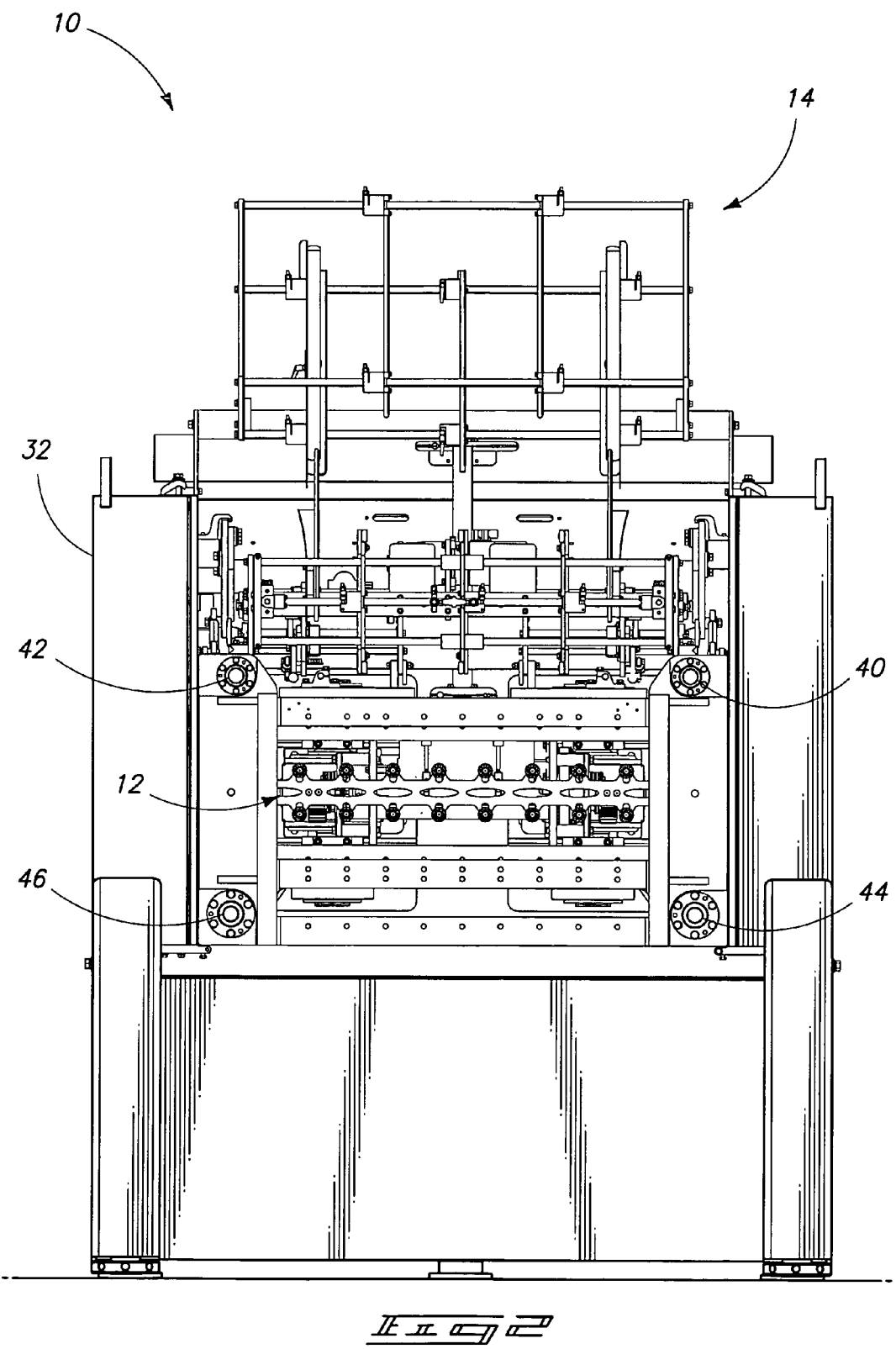
FIG. 2 is a vertical left side, or exit view of the thermoforming machine trim press and article ejector of FIG. 1 relative to the side view depicted in FIG. 1 and omitting the punch mount plate, die mount plate, the stationary platen and the packaging table in order to better visualize the article ejector assembly.
Figure 3:
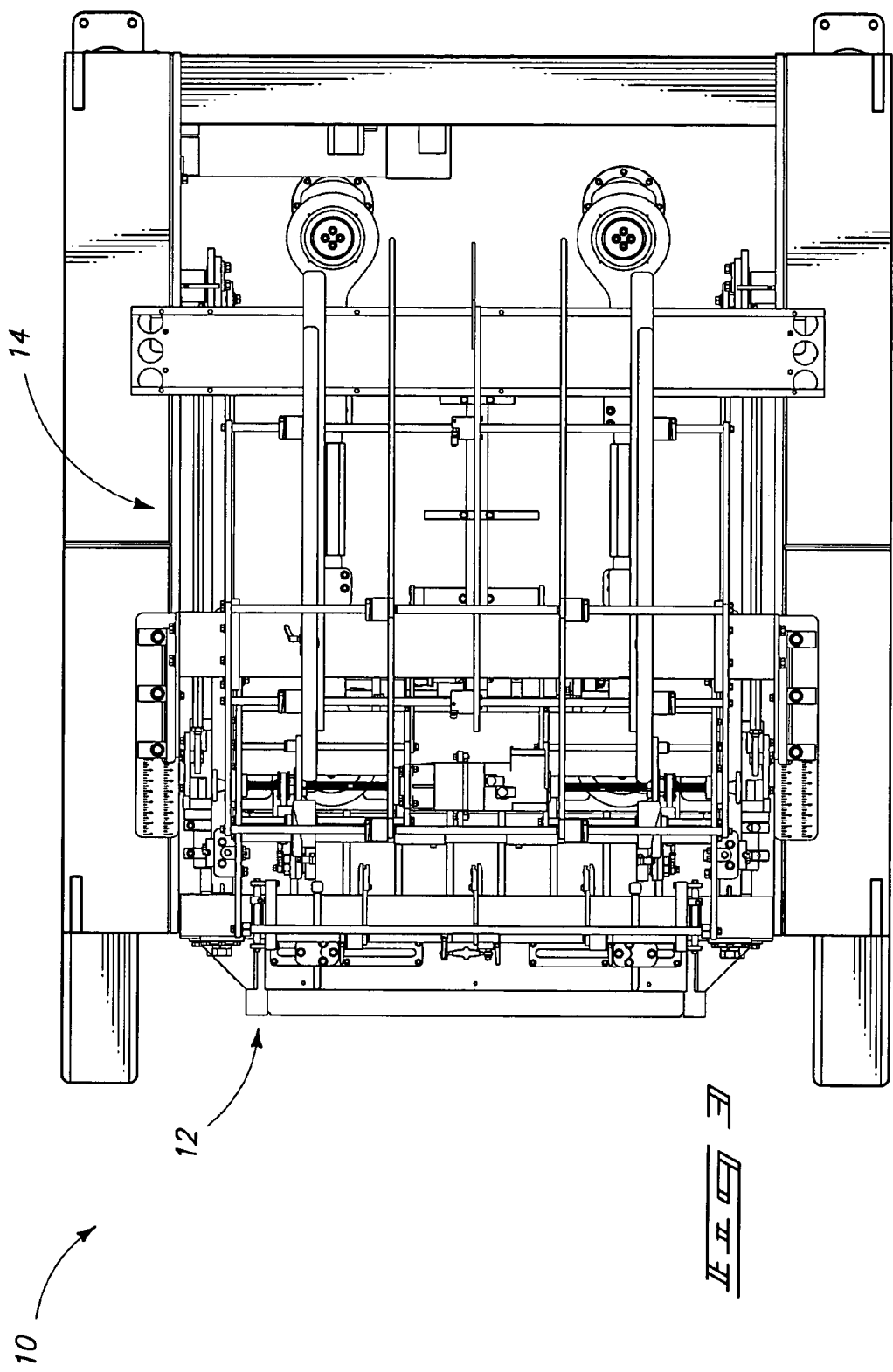
FIG. 3 is a plan view of the article ejector of FIG. 1.

FIGS. 2 and 3 further illustrate the orientation of article ejector 12 on trim press 10. As shown in FIG. 3, the stationary platen of FIG. 1 has been omitted from the drawing in order to facilitate unobstructed viewing of article ejector 12.

Figure 4:
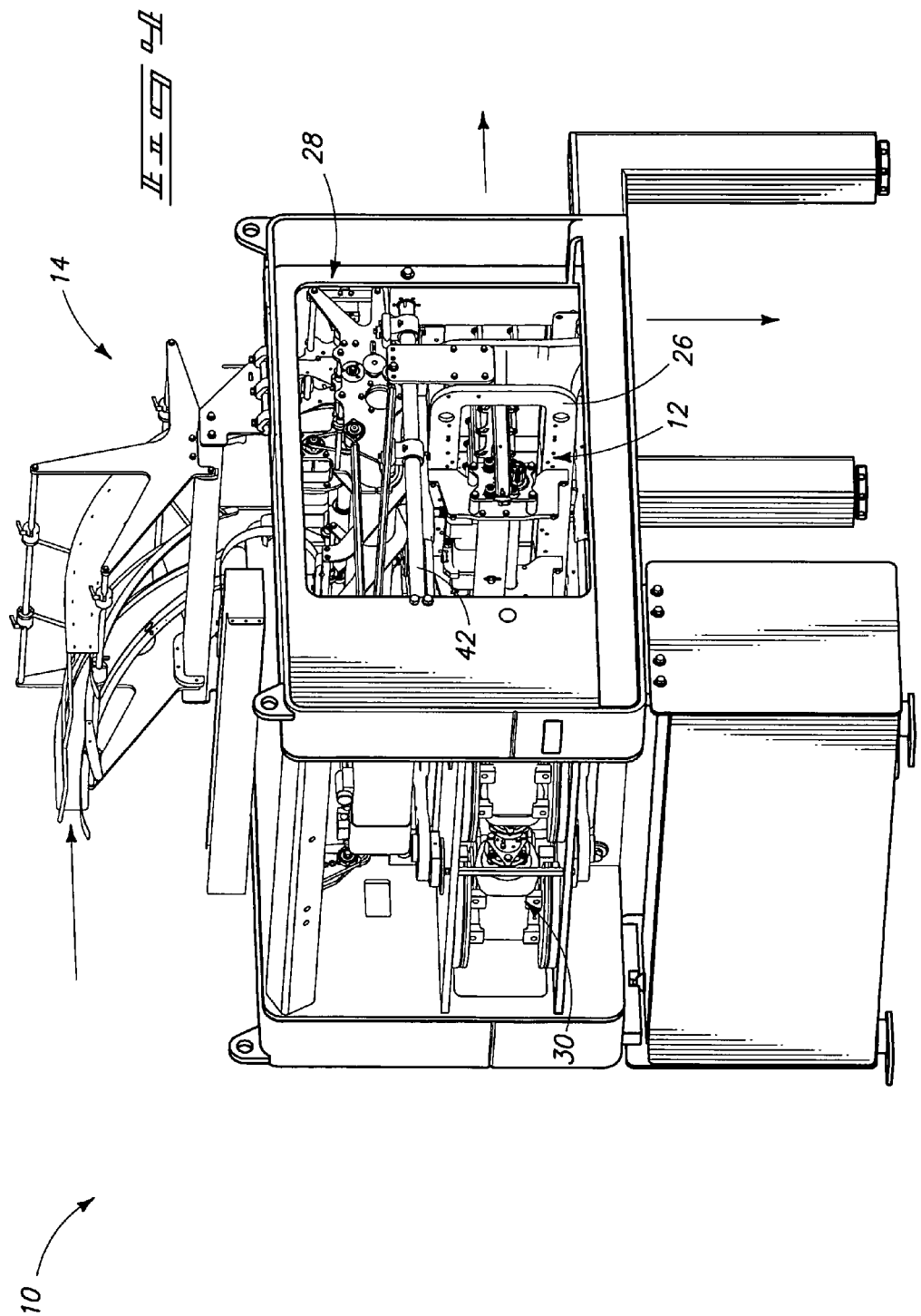
FIG. 4 is a perspective view of the thermoforming machine trim press and article ejector taken left-of-center of the view depicted in FIG. 1.

FIG. 4 further illustrates the arrangement of canopy 14 atop trim press 10, the positioning of treadle 28, and the orientation of drive motor and gearbox 30 relative to moving platen 26. Article ejector 12 is depicted on the back side of moving platen 26. Treadle 28 supports a downstream portion of a web conveyor 25, comprising a set of co-acting drive and follower wheels, one provided on each edge of a web. An upstream portion of canopy 14 (not shown) also includes a set of co-acting drive and follower wheels. Accordingly, a web of thermoformed articles is delivered via canopy 14 and treadle 28 into trim press 10 for severing articles from the web. As the articles are severed, the article ejector separates the articles from the web and from between the co-acting dies on the moving platen 26 (as well as from the stationary platen) for deposition and collection of the articles within article cavities in the stationary platen.

FIGS. 5-18 depict the construction details and operation of article ejector 12. More particularly, article ejector 12 is driven by a reciprocating drive mechanism 56 that is rigidly affixed onto moving platen 26 via a pair of side plates 82 and 84 that are bolted onto a back surface of moving platen 26 and joined together with a rigid cross member 86 via threaded fasteners. Drive mechanism 56 comprises a pair of linear actuators 60 and 62 that are driven to-and-fro for linear reciprocation via a computer controlled servo drive motor 58 that is rigidly affixed onto side plates 82, 84 and cross member 86. According to one construction, drive motor 58 comprises a Siemens servo motor, model No. 1FT5066-1AC71-4FA0, from Siemens Energy and Automation, and available in the United States of America from Siemens Corporation, of New York, N.Y., as well as through various distributors.

According to one construction, linear actuator 60 comprises a rack 64 and an intermeshing pinion 68. Likewise, linear actuator 62 comprises a rack 66 and an intermeshing pinion 70. Racks 64 and 66 are moved to-and-fro for extension and retraction via rotation of pinion 68 and 70, respectively. Pinion 68 and 70 are rigidly affixed together via a common drive shaft 81 which is driven by motor 58 via a toothed pulley 73, a drive belt (or timing belt) 75 (see FIG. 6) and a toothed pulley 71 (see FIG. 6). Shaft 80 is journalled for rotation at either end via bearings 77 and 79, as shown in FIG. 5. Motor 78 drives belt 75 via pulley 71 (of FIG. 6) in order to rotate pulley 73 and shaft 81 of FIG. 5.

As shown in FIGS. 5 and 6, an ejector platen 76 is rigidly affixed onto a distal end on each rack 64 and 66. Preferably, ejector platen 76 is removably affixed on each end of rack 64 and 66 using one or more threaded fasteners, as described below in reference to FIG. 9. Accordingly, ejector platen is interchangeably mounted onto the distal ends of rack 64 and 66 so as to enable reconfiguration of article ejector 12 for different configurations of dies by changing the ejector platen.

A pair of sensors 67 (see FIG. 5) and 69 (see FIG. 6) are configured to each detect proximity of a steel slug 65 (see FIG. 10) and a steel end fitting 110 (see FIG. 9), respectively, in order to assist a control system in determining the relative position of rack 66 and ejector platen 76. One suitable construction for sensors 67 and 69 is provided by Balluf, Inc., of Florence, Ky., as a model No. BES-51-375-S4-C tubular inductive proximity sensor on non-contact electromagnetic principles. Sensors 67 and 69 detect when steel (or ferrous) slug 65 and fitting 110 are placed in proximity to each sensor, thereby enabling the control system to determine the relative position of rack 66 as slug 65 and end fitting 110 pass by a respective one of the sensors 67 and 69. Accordingly, steel slug 65 and steel end fitting 110 are placed on rack 66 at spaced-apart locations relative to sensor 67 and 69.

Also shown in FIGS. 5-8, two rows of ejector pins, or rods 78 are removably fastened in spaced-apart relation in two rows along ejector platen 76 via individual threaded fasteners. A distal end of each ejector pin 78 terminates in a piston, or plunger 80 that contacts with articles as they are being ejected by extension of article ejector 12. Pin 78 cooperates with plunger 80 to provide ejector pin assembly 38 (see FIG. 1).

In FIGS. 5-9, a punch mount plate 126 (see FIG. 11) has been omitted in order to facilitate viewing of the various components of article ejector 12. Likewise, various components have been omitted from FIGS. 7 and 10 to enable viewing of selected components.

In order for motor 58 to controllably drive ejector platen 76 between extended and retracted positions, racks 64 and 66 are guided for axial reciprocation by way of respective guide plate assemblies 72 and 74 as shown in FIGS. 5 and 6. Guide plate assemblies 72 and 74 are mounted on respective side plates 82 and 84.

FIG. 5 also illustrates a pair of bushing bores 83 and 85 that are machined into moving platen 26 for receiving bushings therein (not shown). Details of such bushings are disclosed in U.S. Pat. No. 6,067,886, incorporated by reference herein. Additionally, clearance holes 87, 89, 91 and 93 are provided in moving platen 26 to accommodate clearance of alignment pins on a die mount plate that is supported on the stationary platen (not shown).

A control system 88 is also shown in FIG. 5. Control system 88 forms part of a control system for a trim press. However, control system 88 is configured with a driver for servo drive motor 58 in order to controllably regulate operation of servo motor 58 to precisely extend and retract ejector platen 76, pins 78 and plungers 80 to eject articles from between a pair of male and female co-acting dies into an article cavity within or downstream of a stationary platen. In one case, control system 88 can be implemented on a computer controller that is running Ballerina® machine control software from Irwin Research & Development, Inc., of Yakima, Wash.

Control system 88 includes a controller 90 having processing circuitry 92 and memory 94. Accordingly, a user at a computer with a user interface can configure operation of motor 58 in order to time when rack 64 and 66 are extended and retracted, as well as to tailor the depth and rate of extension and retraction to realize a desired depth or rate.

FIG. 6 further illustrates the intermeshing of pinion 68 with a bottom edge of rack 64 of linear actuator 60 or article ejector 12. Likewise, construction details of linear actuator 60 are also shown.

FIG. 7 further illustrates the configuration of sensors 67 and 69 relative to steel slug 65 and steel end fitting 110 which are affixed apart at specific locations along rack 66. Selected components have been removed from this view to facilitate viewing of desired components. In operation, sensor 67 detects proximate positioning of slug 65 relative to sensor 67; whereas, sensor 69 detects proximate positioning of steel end fitting 10 relative to sensor 69. Rack 1066 (as well as rack 1064) is made from non-ferrous aluminum which does not generate a signal from the sensors. Feedback signals are generated by sensors 67 and 69 when slug 65 and end fitting 110 are placed in proximity therewith which are delivered via electrical cables (not shown) directly to control system 88 (see FIG. 5) to provide input signals thereto. The control system then uses such signals to accurately locate the positioning of rack 66 and the associated ejector platen and ejector pins. The control system then activates movement of the ejector platen and ejector pins based upon such feedback into desired axial displacement positions via activation of servo drive motor 58. Sensors 57 and 59 provide feedback signals that enable the control systems to identify axial positioning of rack 66 as sensors 57 and 59 detect proximate positioning of steel slug 65 and steel end fitting 110. A slight clearance gap is provided between sensors 57 and 59 and slug 65 and end fitting 110, respectively. Sensors 57 and 59 electromagnetically detect magnetic property changes due to proximity of steel (or ferrous) slug 65 and steel (or ferrous) end fitting 110.

FIG. 8 illustrates article ejector 12 on platen 26 taken from another orientation in order to better view the configuration of ejector pins 78 and plungers 80. Pins 78 and plungers 80 are shown in a fully retracted position. In such view, the punch mount plate has been omitted in order to enable better viewing of the pins and plungers.

Figure 9:
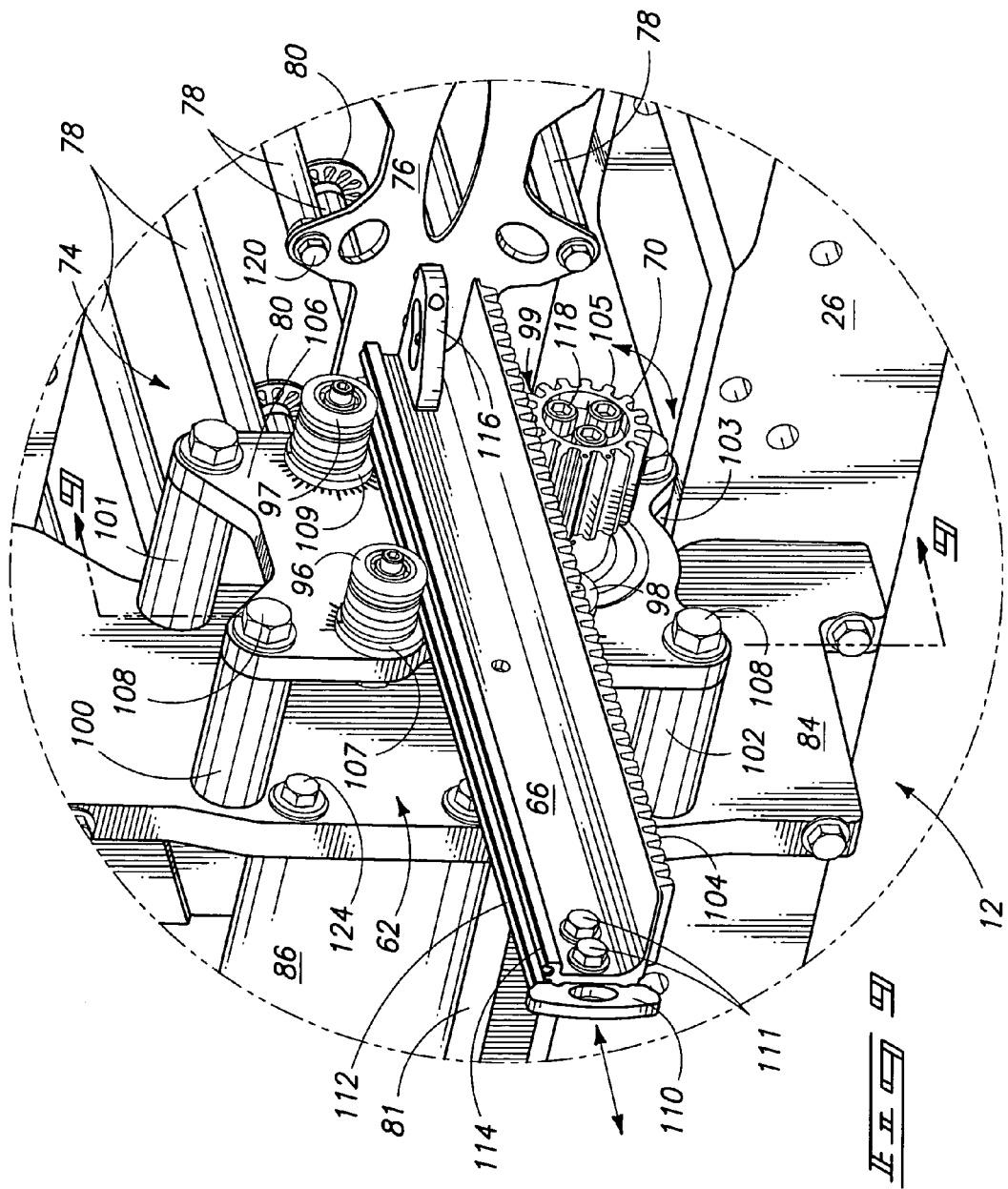
FIG. 9 is a further enlarged perspective view taken within the encircled region 9 of FIG. 5 and further illustrating construction of one linear actuator of the article ejector mechanism.

FIG. 9 illustrates in greater detail the construction of linear actuator 62 of article ejector 12. It is understood that linear actuator 60 (of FIG. 6) is similarly constructed in a mirror-image configuration. However, linear actuator 60 does not have an array of motion sensors. More particularly, linear actuator 62 includes rack 66 being supported for axial reciprocation by a pair of upper, double width rollers 96 and 97, as well as a pair of lower single width rollers 98 and 99. Configuration of the corresponding rollers on linear actuator 60 is further illustrated in FIG. 6. Pinion 70 is rotated clockwise and counter-clockwise via the drive motor in order to extend and retract rack 60 along with ejector plate 76, pins 78 and plungers 80. Rollers 96-99 are rigidly affixed onto a mounting plate 106 of guide plate assembly 74. Double rollers 96 and 98 are affixed onto an eccentric mounting plate 107 and 109 wherein each roller 96 and 98 has a central axis that is offset from the center of rotation on mount 107 and 109. Accordingly, mounts 107 and 109 can be rotated to a desired position (before tightening them) in order to move rollers 96 and 97 closer together (or further apart) relative to opposed rollers 98 and 99. Accordingly, the distance between pairs of rollers 96, 98 as well as 97, 99 can be adjusted by rotating mounts 107 and 109 to ensure a good fit up of rack 66 therebetween and to eliminate any slop therebetween. Accordingly, rack 66 is precisely guided for axial reciprocation between rollers 96-99.

According to one construction, rollers 96-99 are each machined from case hardened 1214 steel. Racks 64 and 66 are constructed from hard anodized aluminum that is tough-coated. Additionally, pinion 70 is constructed from Nylatron®. Alternatively, pinion 70 can be constructed from bearing bronze or some other material. In order to reduce the mass of reciprocating components within article ejector 12, rack 64 and 66, angle brace 16, ejector platen 76 and pins 78 are all constructed from light weight aluminum. In one case, pins 78 are constructed from aluminum tube, and all the moving components weigh under 10 pounds. Furthermore, plunger 80 is constructed from Nylatron®. Alternatively, plunger 80 can be constructed from aluminum. Even further alternatively, plunger 80 can be constructed from Nylatron® or aluminum and can have a foam pad affixed onto a distal end where contact is made with an article. Nylatron® is a registered trademark of The Polymer Corporation, Redding, Pa., U.S.A.

As shown in FIG. 9, plate 106 is rigidly affixed onto side plate 84 in spaced-apart relation using four bosses (or cylindrical spacers) 100-103. Mounting plate 106 is rigidly affixed onto side plate 84 by receiving a threaded fastener (or a bolt) 108 through each hollow boss 100-103 for threaded engagement into a respective threaded aperture (not shown) within side plate 84. Side plate 84 is further rigidly supported relative to opposite side plate 82 (see FIG. 5) by rigidly affixing side plate 84 onto a cross member 86 using a pair of threaded fasteners (or bolts) 124.

As shown in FIG. 9, rack 66 includes a plurality of teeth 104 arranged in a linear array along a bottom face of rack 66. Complementary teeth 105 are provided along a cylindrical outer surface of pinion 70 for inter-engagement with teeth 104 as pinion 70 is rotated there against. Ejector platen 76 is affixed onto a distal end of rack 66 using an angled brace 116 that is secured with fasteners to ejector platen 76, as well as to a sidewall of rack 66. Accordingly, ejector platen 76 can be replaced with a different ejector platen when dies are changed on a trim press.

To trap rack 66 between rollers 96-99, an end stop fitting 110 is secured onto a proximal end of rack 66 using a pair of threaded fasteners 111. According to one construction, end stop fitting 110 is formed from 836 steel. End stop fitting 110 is enlarged relative to a vertical flange on rack 66 so as to prevent passage of rack 66 completely through and between rollers 96-99. At an opposite distal end of rack 66, ejector platen 76 prevents inadvertent advancement of rack 66 completely through and between rollers 96-99.

For the case where ejector pins 78 are formed from aluminum tubing, an inner diameter of tubular pin 78 is internally threaded in order to receive a threaded fastener 120. Accordingly, threaded fastener 120 is engaged within tubular pin 78 to rigidly secure pin 78 onto ejector platen 76. As is shown in FIG. 8, pinion 70 is rigidly affixed onto an end of shaft 81 using three threaded fasteners 118. Shaft 81 is supported for rotation in plate 106 via a bearing 79. According to one construction, bearing 79 comprises a roller ball bearing comprising an SKF ball bearing assembly, model No. 6307-2ZNR.

In order to provide a hard bearing surface, yet maintain a light construction for moving parts on article ejector 12, the racks, such as racks 66, are constructed from 6061 T6 aluminum, having a hard anodized surface to $2/1,000^{th}$ of an inch thickness which is also Teflon® coated. To provide a sufficiently hard contact surface for the hardened rollers 97-99, Thompson ball bearing shafts 111, 112 and 113 (see FIG. 10) are mounted on contact portions of rack 66 (as well as rack 64) in order to provide for a hardened contact surface with rollers 96-99.

FIG. 10 further illustrates the construction of linear actuator 62 of article ejector 12. Linear actuator 60 (of FIG. 5) is similarly constructed. More particularly, double roller 96 comprises an assembly of a first roller body 130 and a second roller body 132 mounted on opposite sides of a center hub 142. Each roller body 130 and 132 receives a roller bearing 144 and 146, respectively. One suitable roller bearing comprises a Nice 5/16" inner diameter 7/8" outer diameter roller bearing, model No. 1603DCTM, having an 11/32" wide seal. A threaded fastener 150 (including a washer) is received through eccentric mount 107 and into a threaded retaining nut 154 in order to secure double roller 96 securely onto mounting plate 106 for rotation. Each roller body 130, 132 includes a circumferential groove 136 and 138 provided in a radial outermost surface. Grooves 136 and 138 are configured to receive ball bearing shafts 114 and 112, respectively.

Roller 98 is mounted to mounting plate 106 in a manner similar to double roller 96. However, roller 98 includes a single roller body 134 configured to receive a roller bearing 148 which is constructed the same manner as bearings 144 and 146. A groove 140 is also provided in a circumferential outer surface of roller body 134 configured to receive ball bearing shaft 113. Threaded fastener 152 (along with a washer) secures roller 98 onto mounting plate via a hub 156 by threadingly engaging with a retaining nut 158.

Rack 66 includes a pair of elongate grooves 160, 162 and 164 each configured to receive a respective ball bearing shaft 114, 112 and 113. Each groove 160, 162 and 164 has a cross section that is slightly greater than a semicircle such that shafts 114, 112 and 113 can be press fit into the respective groove for securement therein. In FIG. 10, pinion 70 is shown with cap screw fasteners 118, along with individual teeth 105. Furthermore, mounting plate 106 is shown secured via threaded fasteners 108 and washers 166 to side plate 84. Fasteners 108 are threaded into bosses, such as bosses 100 and 102.

Figure 11:
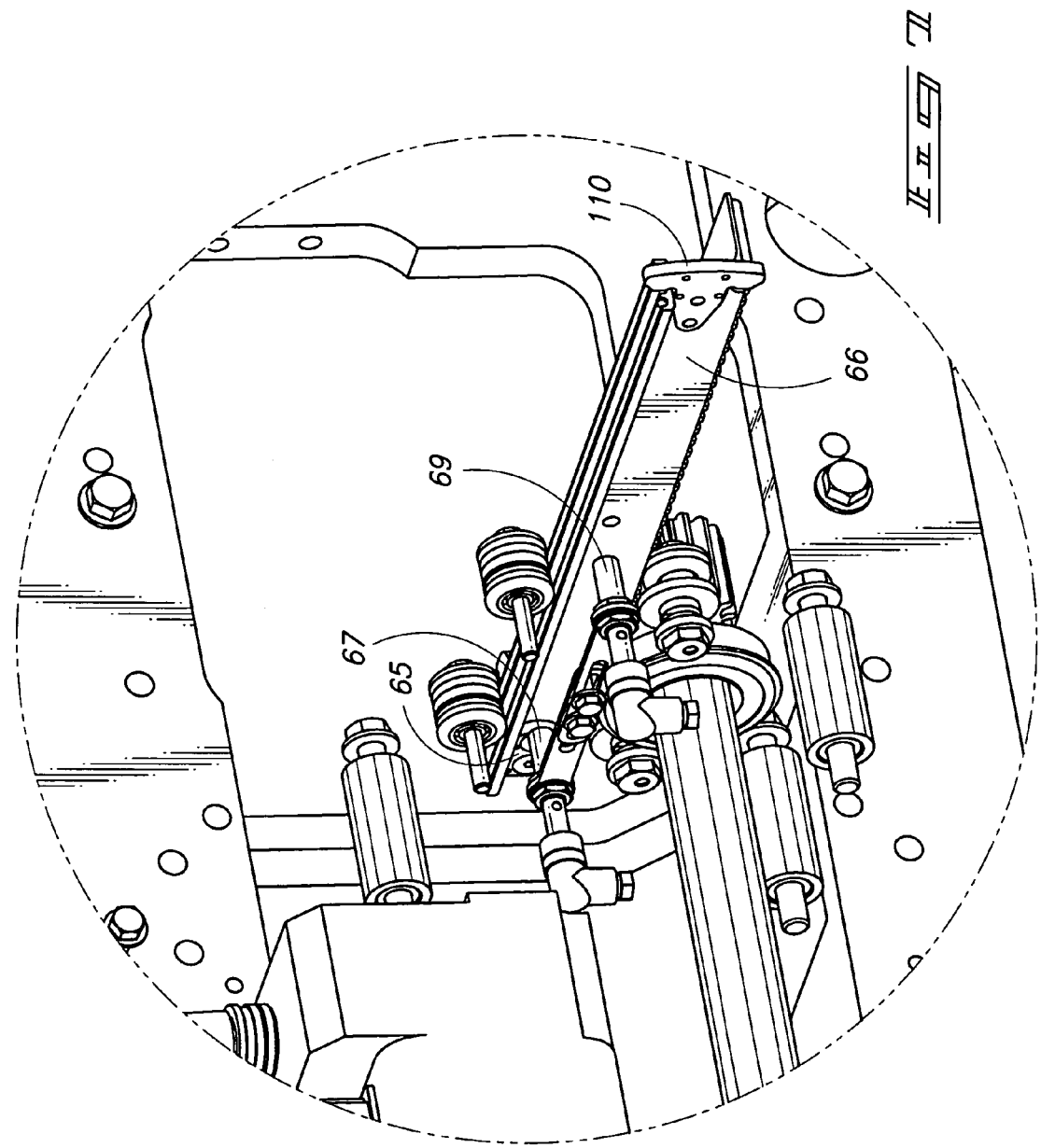
FIG. 11 is a plan view of the article ejector as taken from a left side, or exit end of FIG. 1.

As shown in FIG. 11, an axially reciprocating drive mechanism is provided between racks 64 and 66 as driven by drive motor 58. A punch mount plate 126 supports four bushings 170 that mate in aligned engagement with respective die pins on each corner of a complementary die mount plate 128.

Figure 12:
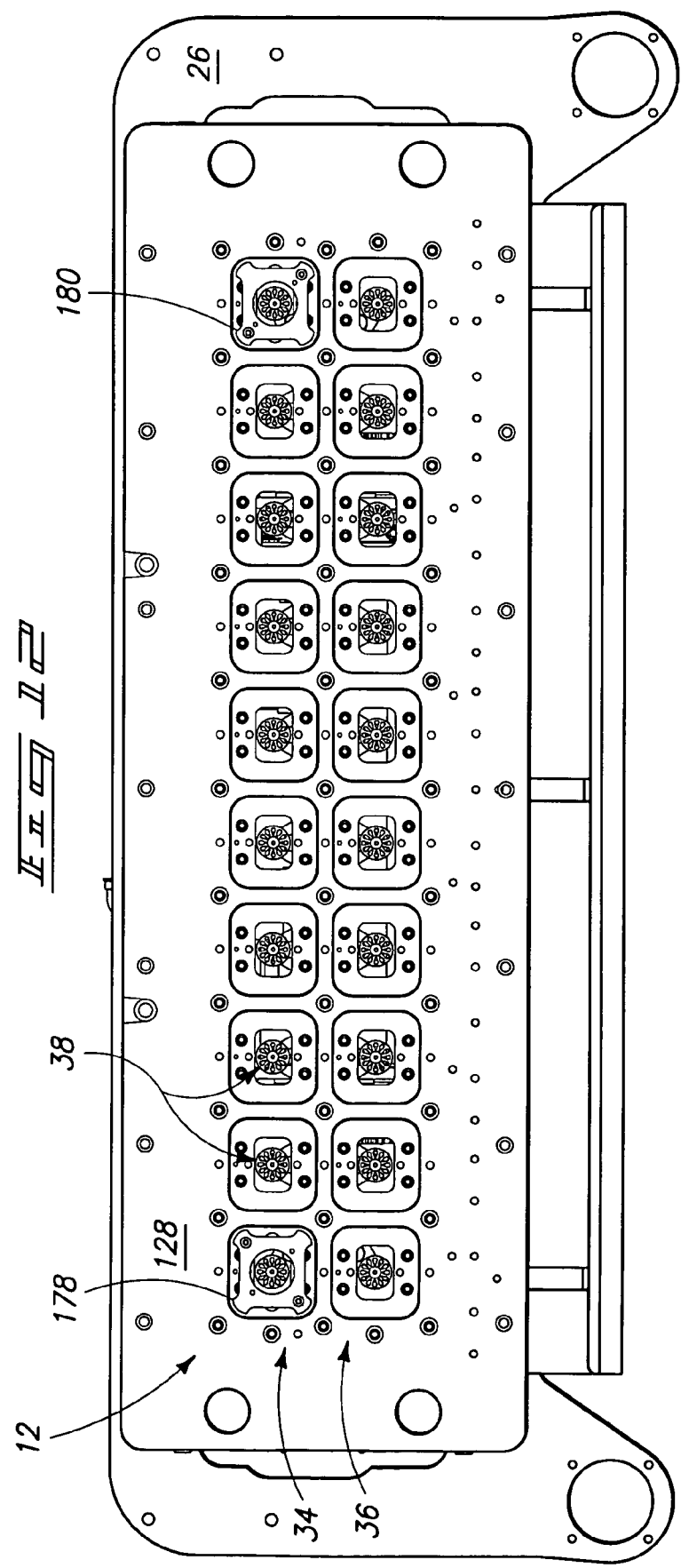
FIG. 12 is a vertical exit end view of the article ejector of FIG. 11 illustrating an exit face of the article ejector, including the punch mount plate and the die mount plate.

FIG. 12 further illustrates the construction of article ejector 12 with the addition of a punch mount plate 126 being secured onto moving platen 26. A die mount plate 128 is also shown in a closed position, against punch mount plate 126. It is understood that die mount plate 128 is actually secured to a stationary platen which has not been shown in this view in order to simplify the drawing. Details of such a stationary platen are presently understood in the art. Punch mount plate 126 includes a pair of bushings that are constructed from heat treated steel that has bearing bronze provided therein for a contact surface. Die mount plate 128 includes a pair of complementary mating die pins 174 and 176 that are received within bushings 170 and 172, respectively as punch mount plate and die mount plate 128 are drawn together during a trim operation.

FIG. 12 further illustrates construction of article ejector 12 relative to die mount plate 128. Rows 34 and 36 of ejector pins 38 are also shown. Row 34 also includes two spaced-apart article alignment structures 178 and 180 configured to accurately align up an array of web-formed articles between co-acting dies between the punch mount plate 126 (see FIG. 11) and die mount plate 128 in order to accurately sever the articles from the web therebetween.

Figure 13:
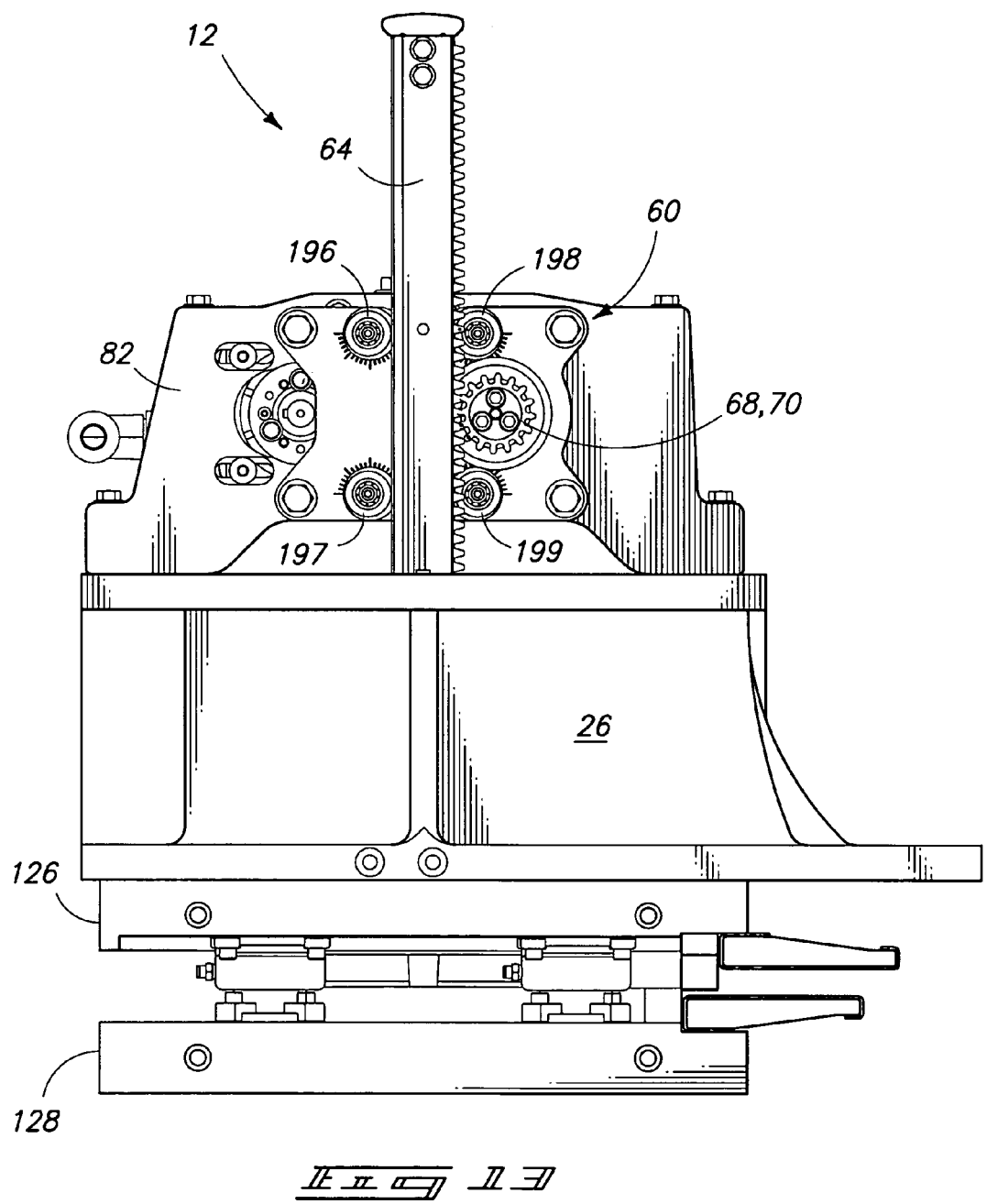
FIG. 13 is a vertical right side view of the article ejector of FIG. 11.

FIG. 13 illustrates article ejector 12 taken from one side. The inner actuator 60 can clearly be seen mounted onto side plate 82 where rack 64 is driven in axial reciprocation to-and-fro via pinion 68. Rack 64 is guided in accurate linear reciprocation by rollers 196-199. Rollers 196-199 are essentially identical, but are placed in mirror image relationship relative to rollers 96-99 (of FIG. 9). Furthermore, punch mount plate 126 and die mount plate 128 are shown closed together and a stationary platen has been omitted in order to simplify layout of the drawing.

Figure 14:
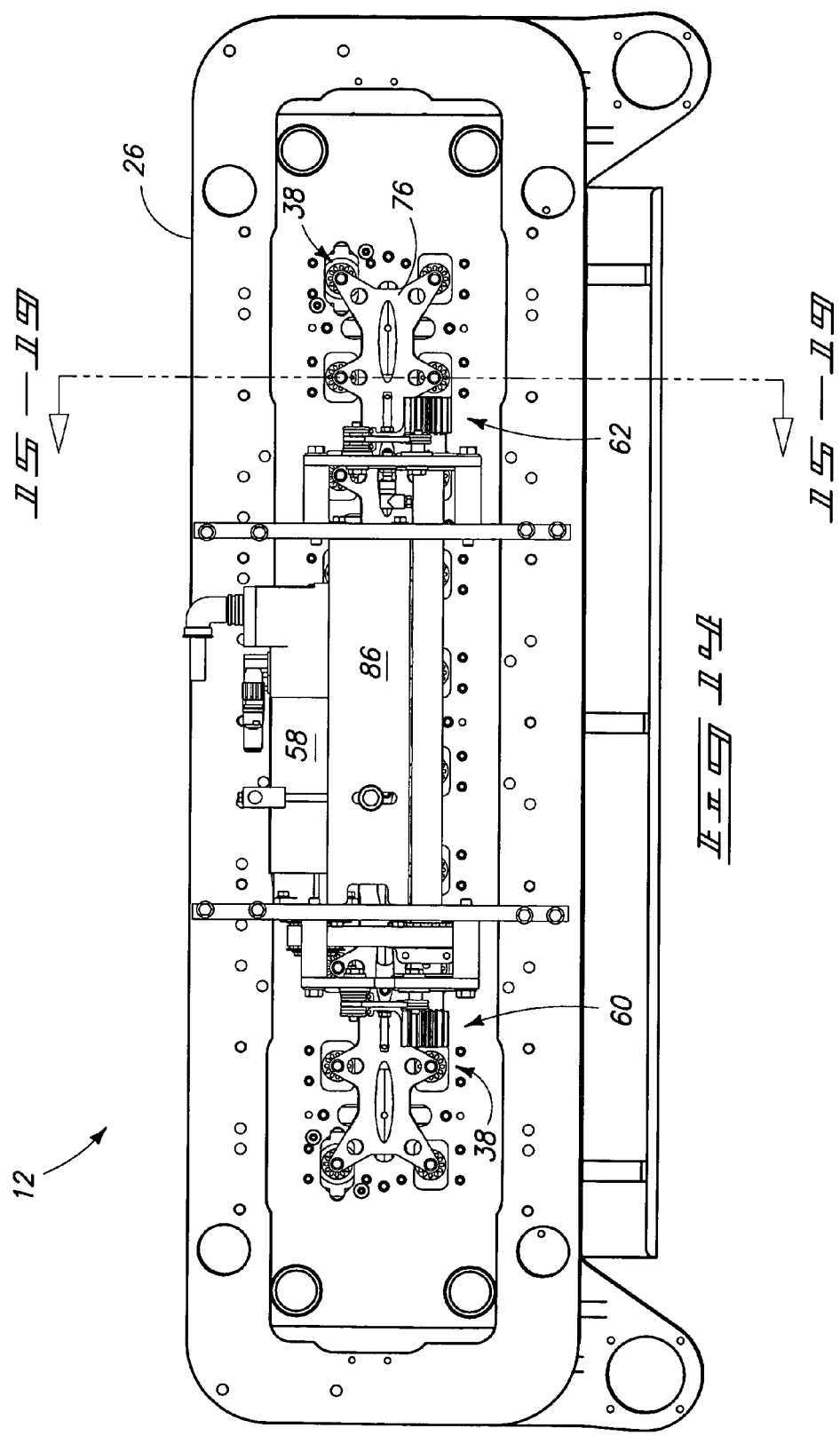
FIG. 14 is a back side view of the article ejector of FIG. 11.

FIG. 14 illustrates article ejector 12 taken from a view directly opposite to that taken in FIG. 13. Linear actuators 60 and 62 are shown in relation to servo drive motor 58 for axially reciprocating ejector platen 76 and ejector pin assemblies 38 between extended and retracted positions.

Figure 15:
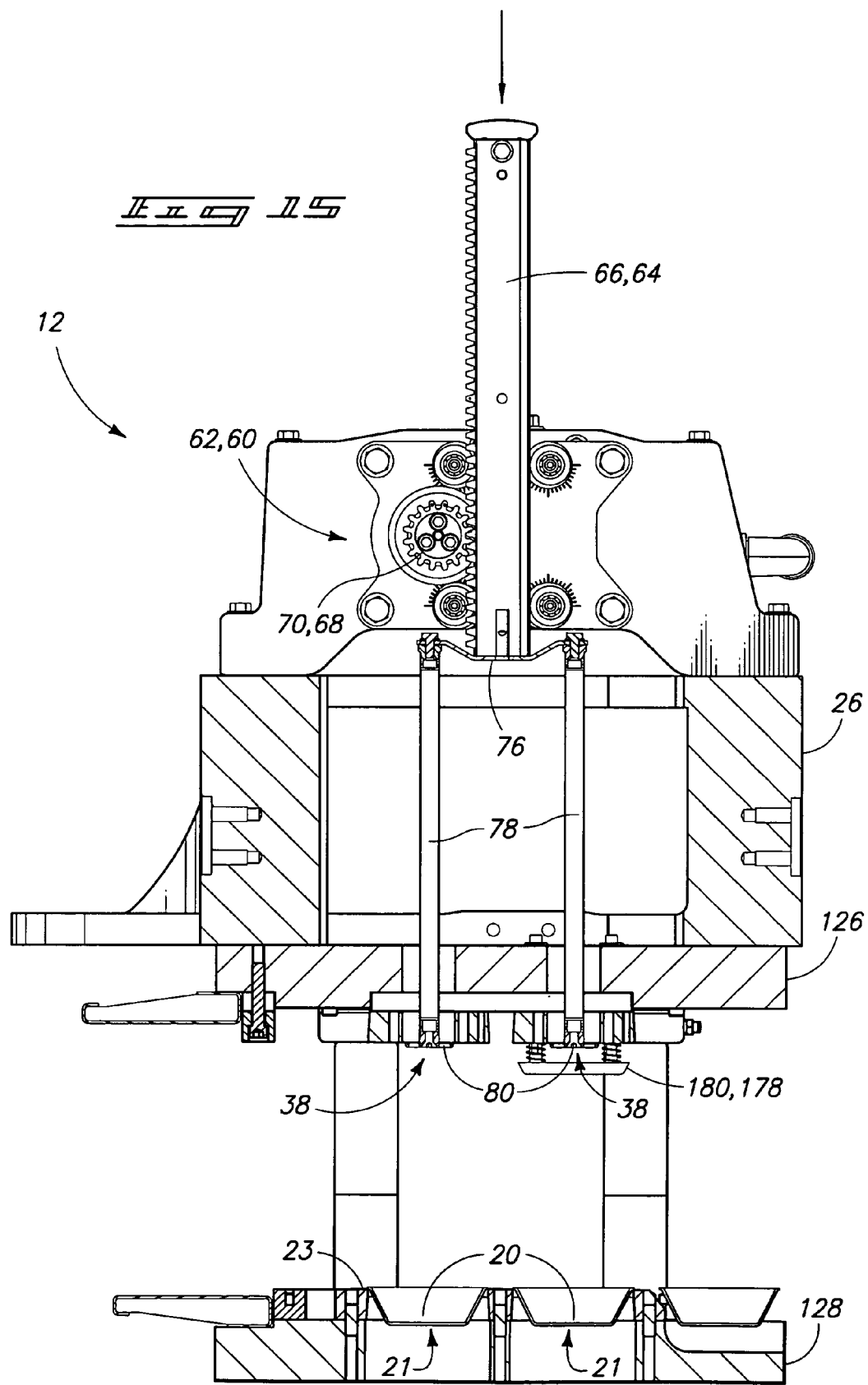
FIG. 15 is a simplified cross-sectional view of the article ejector taken along line 15-15 of FIG. 14 and illustrating the ejector in a completely retracted position and the tool in an open position.

FIG. 15 illustrates article ejector 12 with ejector platen 76 and respective ejector pin assemblies 38 in a fully raised (or retracted) position, and with punch mount plate 126 raised (or retracted) relative to die mount plate 128. Such position corresponds with the trim tools (plates 126 and 128) being provided in a maximum, open position.

Figure 16:
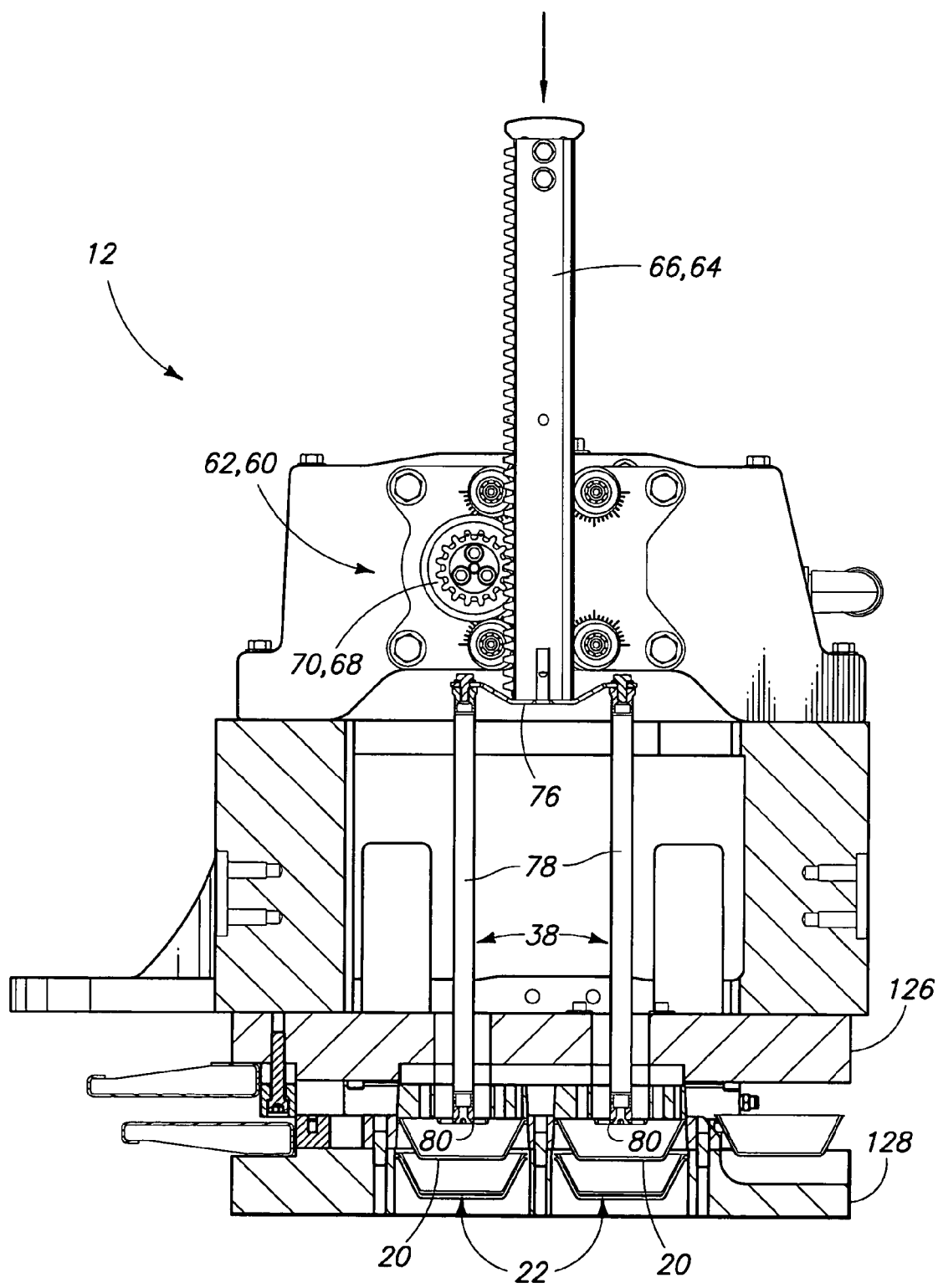
FIG. 16 is a simplified cross-sectional view taken along line 16-16 of FIG. 14 later in time than FIG. 15 and illustrating the article ejector in a fully retracted position with the tool in a fully closed position.

FIG. 16 illustrates article ejector 12 in a fully raised (or retracted) position, but with plates 126 and 128 in a fully closed, or engaged position. Such closed position corresponds with articles 20 being severed from a web.

Figure 17:
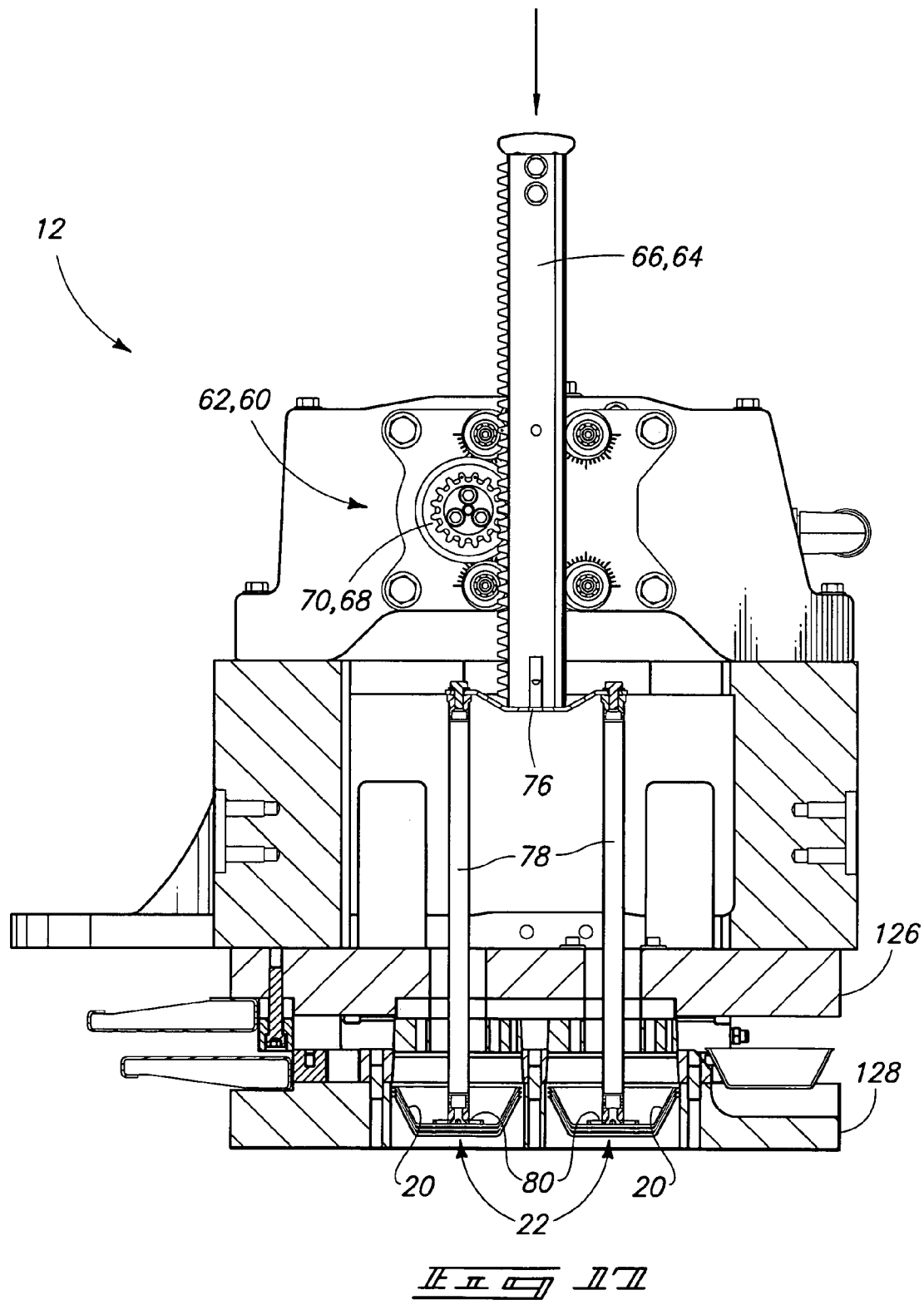
FIG. 17 is a simplified cross-sectional view taken along line 17-17 of FIG. 14 later in time than FIG. 16 and illustrating the article ejector with 2" of downward stroke, and depicting the tool in a closed position.

FIG. 17 illustrates article ejector 12 with plates 126 and 128 in a fully closed position, and with ejector platen 76 being extended downwardly 2" of stroke responsive to rotation of pinions 70, 68 and axial displacement of rack 66 and 64, respectively. Ejector pin assemblies 38 are shown lowered 2" to initiate engagement via plungers 80 with articles 20 so as to downwardly displace individual articles 20 into a stack 22 of such articles.

Figure 18:
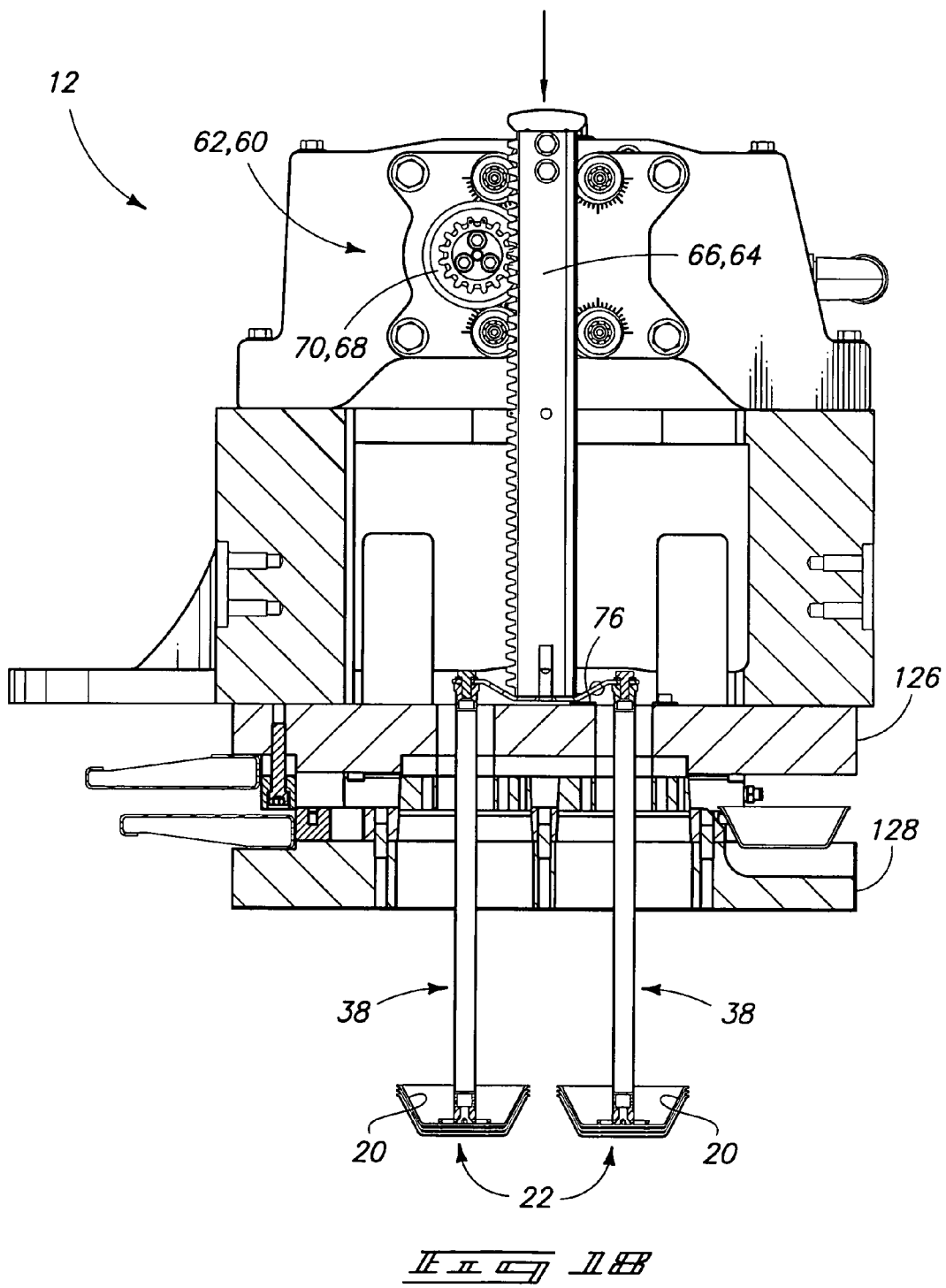
FIG. 18 is a simplified cross-sectional view taken along line 18-18 of FIG. 14 later in time than FIG. 17 and illustrating the ejector with 8" of downward stroke, and further illustrating the tool in a closed position.

FIG. 18 further illustrates article ejector 12 with platens 126 and 128 still in a closed position, but with ejector platen 76 driven to a maximum extended position of 8" of stroke so that ejector pin assemblies 38 have fully, or maximally ejected stacks 22 of articles 20 from plates 126 and 128.

Figure 19:
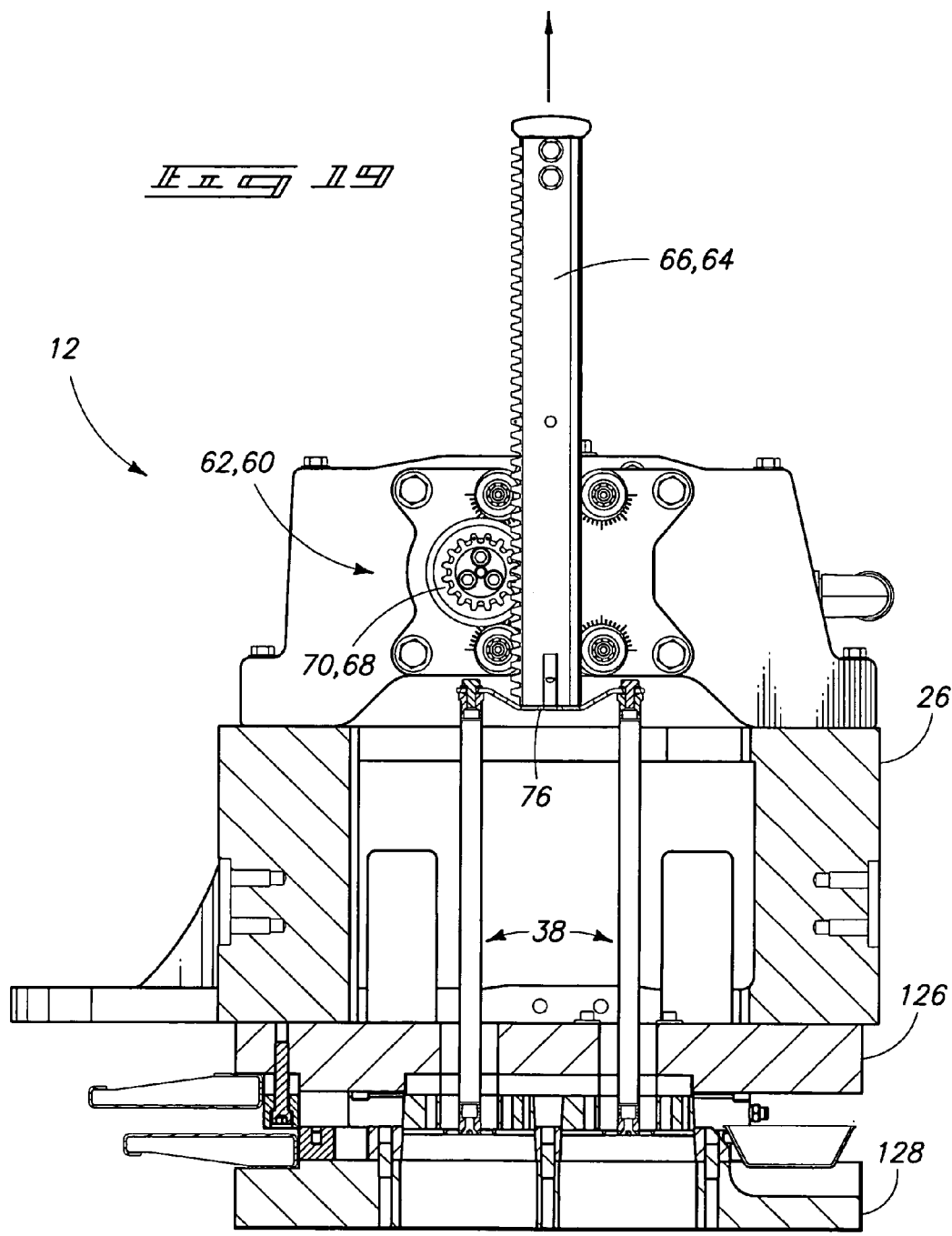
FIG. 19 is a simplified cross-sectional view taken along line 19-19 of FIG. 14 later in time than FIG. 18 and illustrating the ejector in a fully retracted position, and further illustrating the tool in a closed position.

FIG. 19 illustrates the steps subsequent to that depicted in FIG. 18 wherein article ejector 12 is shown with ejector platen 76 being raised so as to also raise ejector pin assemblies 38, but plates 126 and 128 are still shown close together as moving platen 26 has not yet been raised. Subsequent in time to the position depicted in FIG. 19, moving platen 26 is then raised so as to separate plates 126 and 128. At such point, a web of thermoformable articles is advanced into a trim press such that two new rows are presented between plates 126 and 128, corresponding with the configuration depicted in FIG. 15. At such point, the process proceeds again from FIGS. 15-19 while the web of material is held stationary during the trim operation.

FIGS. 20-28 illustrate a second embodiment article ejector 1012 that is an alternative to that depicted in FIGS. 1-19. More particularly, a second embodiment article ejector 1012 is shown mounted onto a moving platen 1026 that is identical to platen 26 of FIGS. 1-19. Accordingly, article ejector 1012 is intended to be mounted onto trim press 10 of FIGS. 1-4 in substitution for article ejector 12. For purposes of describing components of such second embodiment article ejector 1012, like and similar components to those of platen 12 have been numbered so as to add "1000" to the same number. Additionally, components are removed in some views to avoid visual obstruction of components and help in describing components that implement the novel features of the present invention.

In summary, article ejector 1012 differs from article ejector 12 (of FIGS. 1-19) in that sensors 1066 and 1067 are mounted along an outside surface of rack 1066 at spaced-apart locations for respectively detecting proximate positioning of steel slugs 1065 and 1063 adjacent each sensor. This outer mounting configuration improves access to sensors 1066 and 1067 for maintenance and repair. In contrast, sensors 66 and 67 of FIGS. 1-19 are provided on an inside surface of rack 66. Furthermore, angle braces 1116, analogous to angle braces 116 (of FIGS. 1-19), are mounted with fasteners onto an inner vertical surface of each rack 1064 and 1066. The interchangeable ejector platen is modified to mount to these angle braces (with pairs of threaded fasteners) by adjusting positioning of the mount holes to match positioning of each angle brace.

Figure 22:
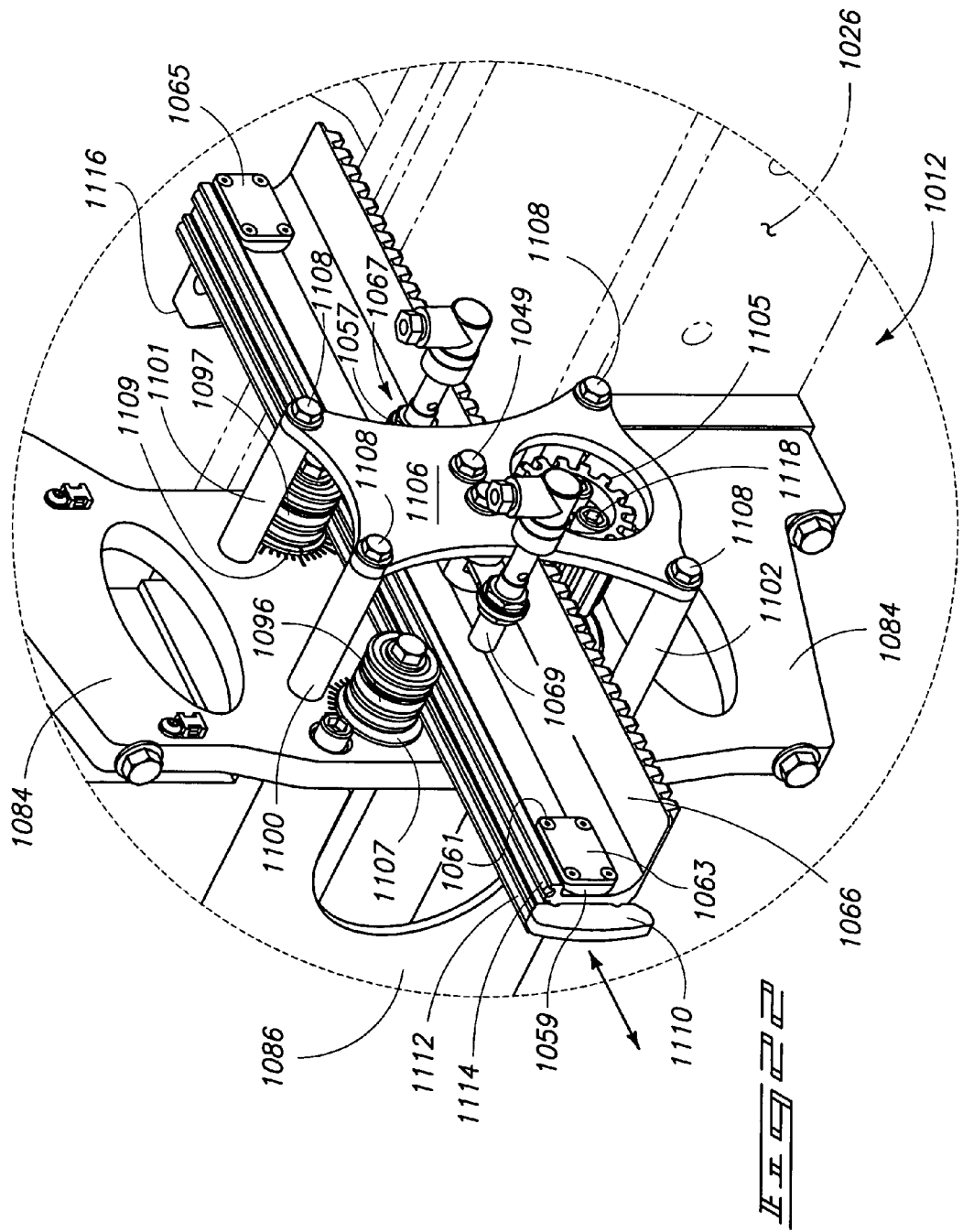
FIG. 22 is a further enlarged perspective view taken within the encircled region 22 of FIG. 20 and further illustrating construction of the linear actuator and sensor array for the article ejector mechanism according to the second embodiment construction.
Figure 23:
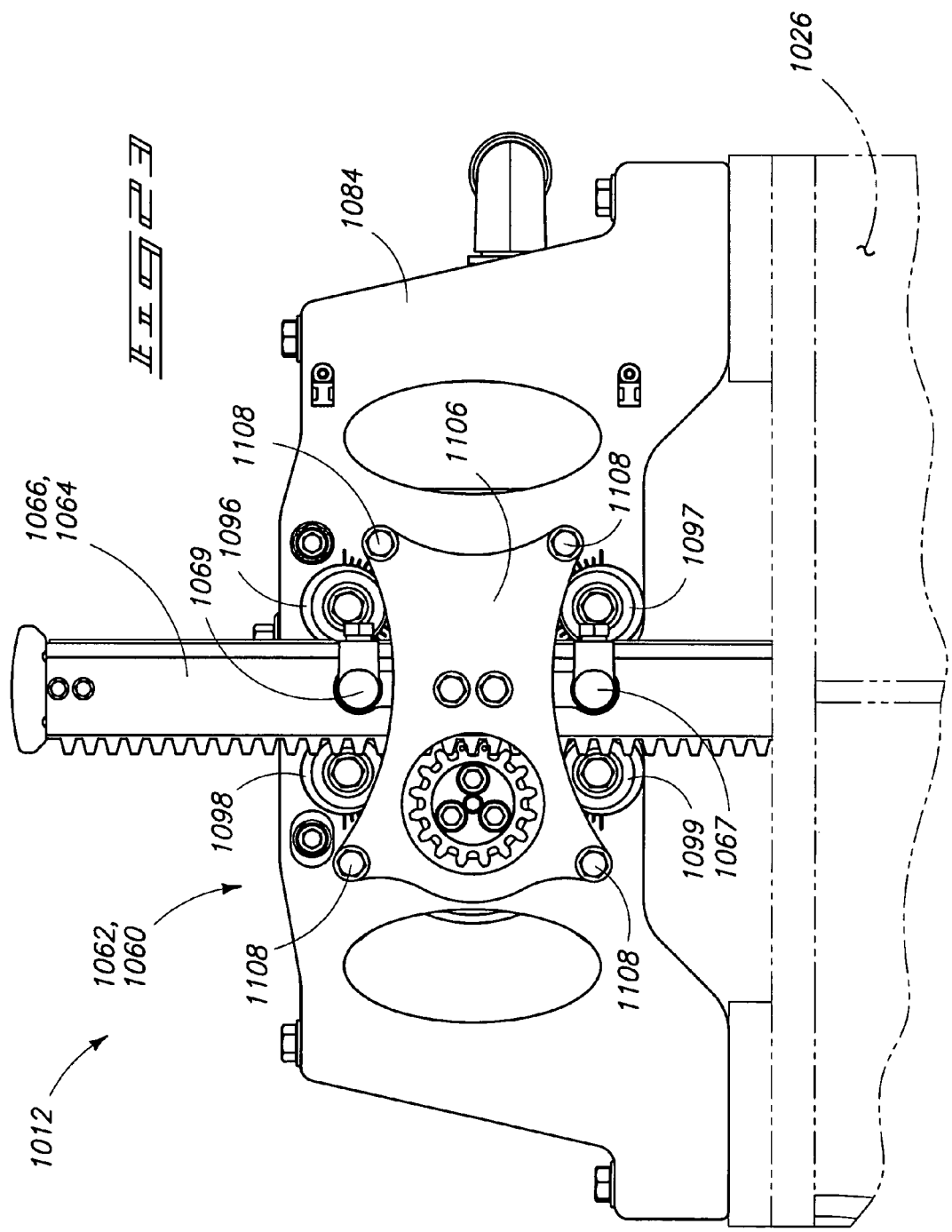
FIG. 23 is an enlarged, vertical right side view illustrating selected components for the article ejector of FIG. 20.
Figure 24:
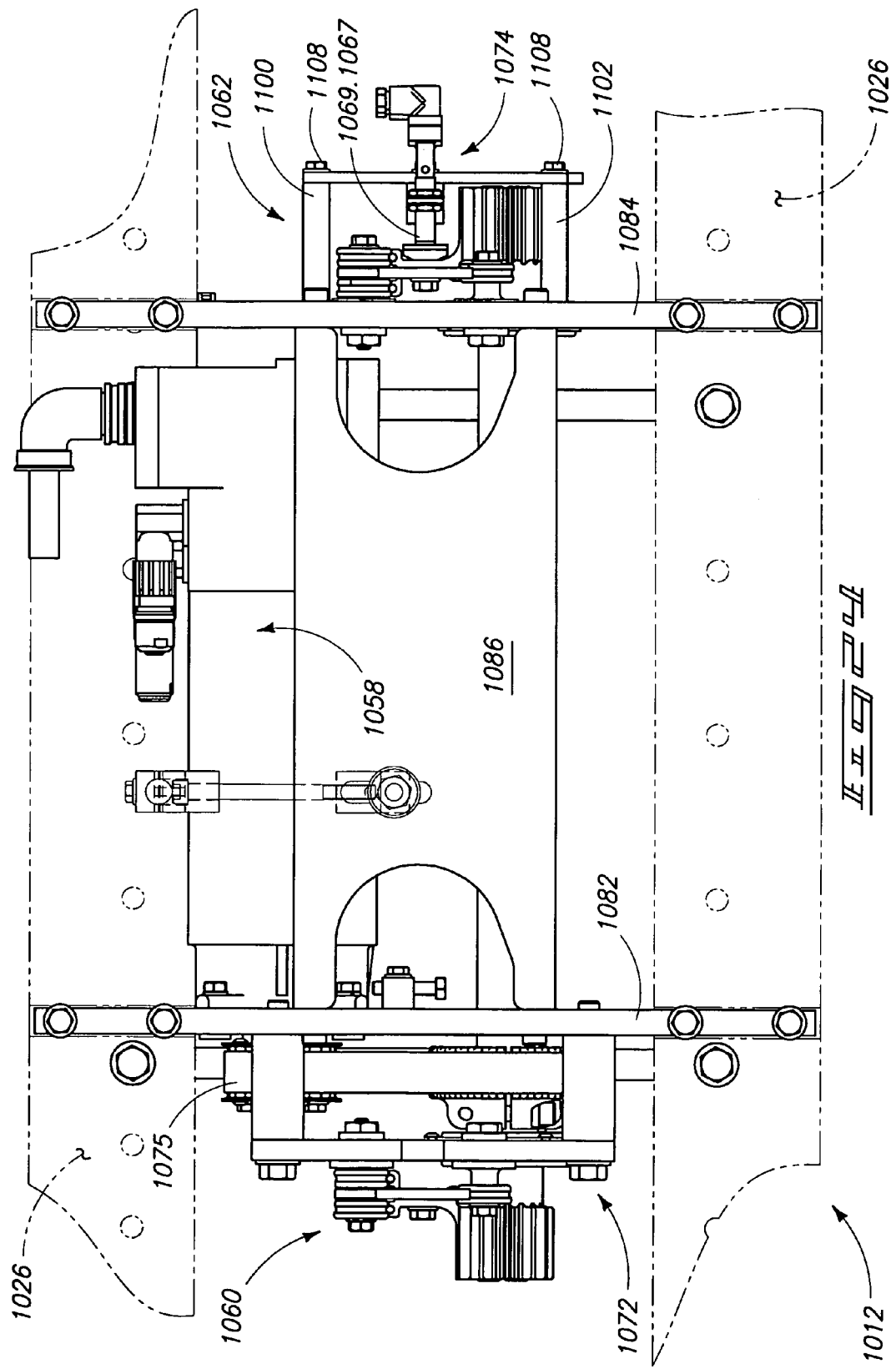
FIG. 24 is a partial end view taken from above relative to FIGS. 23 and 25 with portions of a trim press removed.
Figure 25:
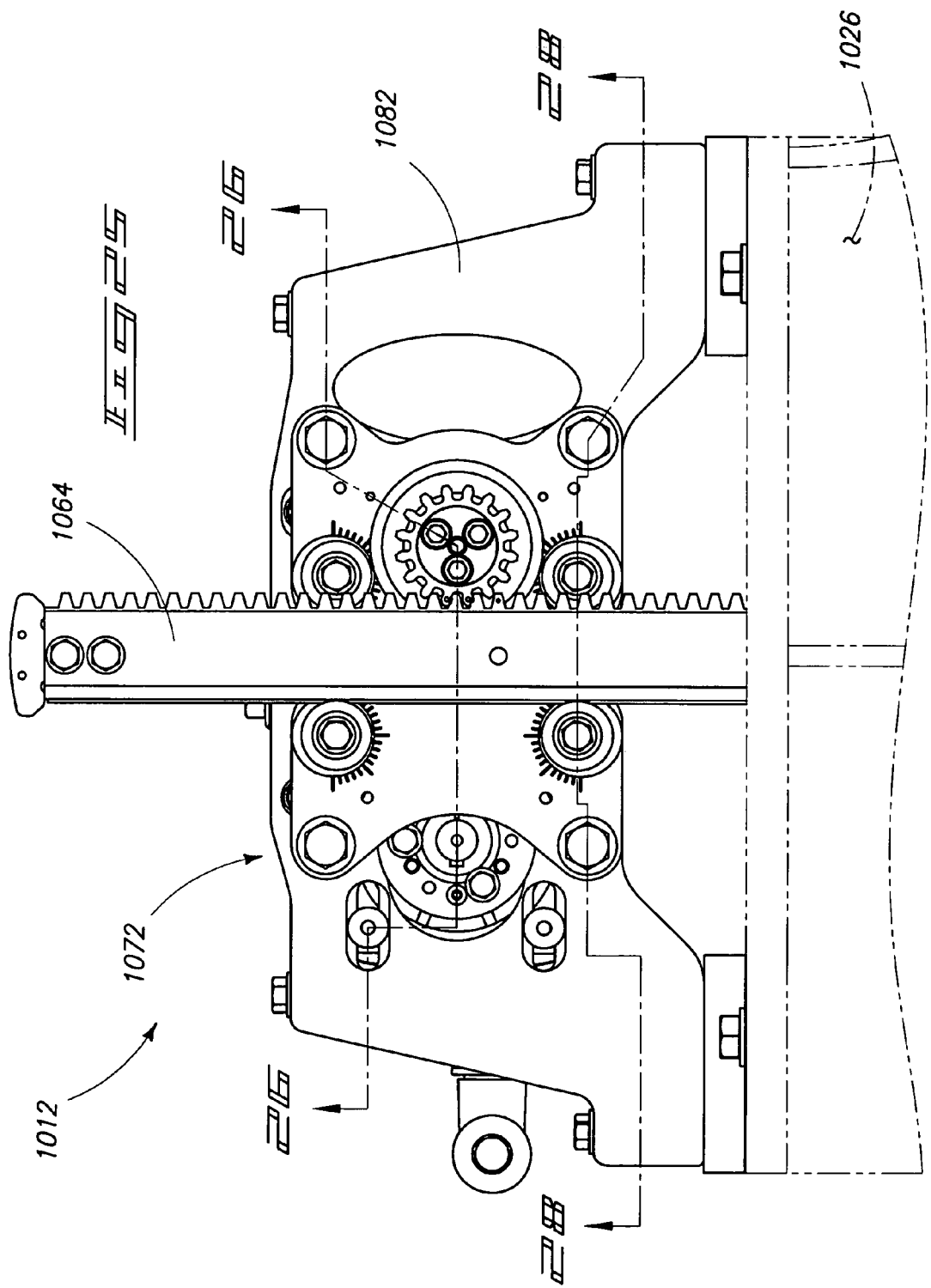
FIG. 25 is an enlarged, vertical left side view illustrating selected components for the article ejector of FIG. 20.
Figure 26:
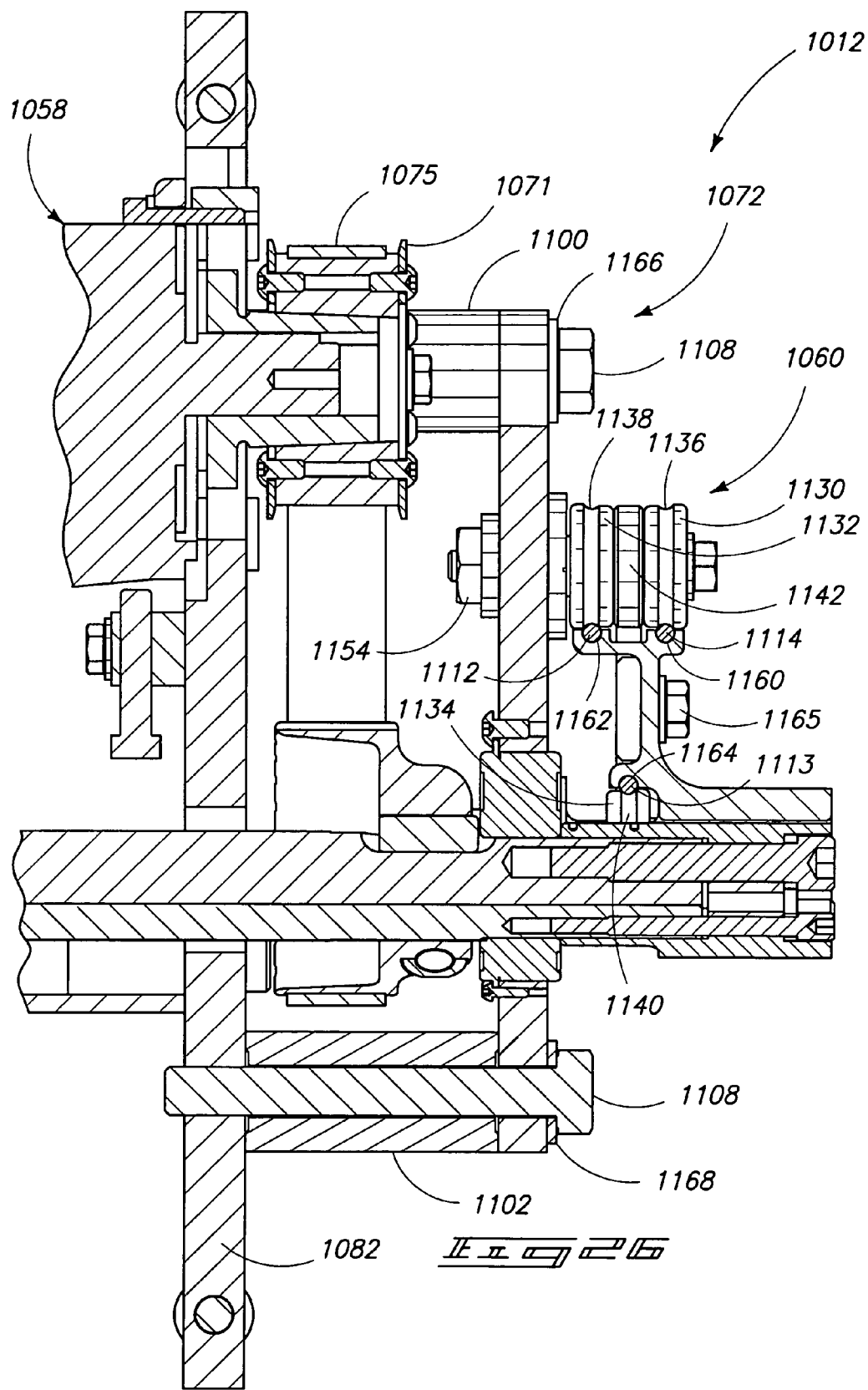
FIG. 26 is an enlarged, vertical sectional view taken along line 26-26 of FIG. 25 and illustrating interaction of a pair of rollers on a rack mount plate with a respective rack of the article ejector.
Figure 27:
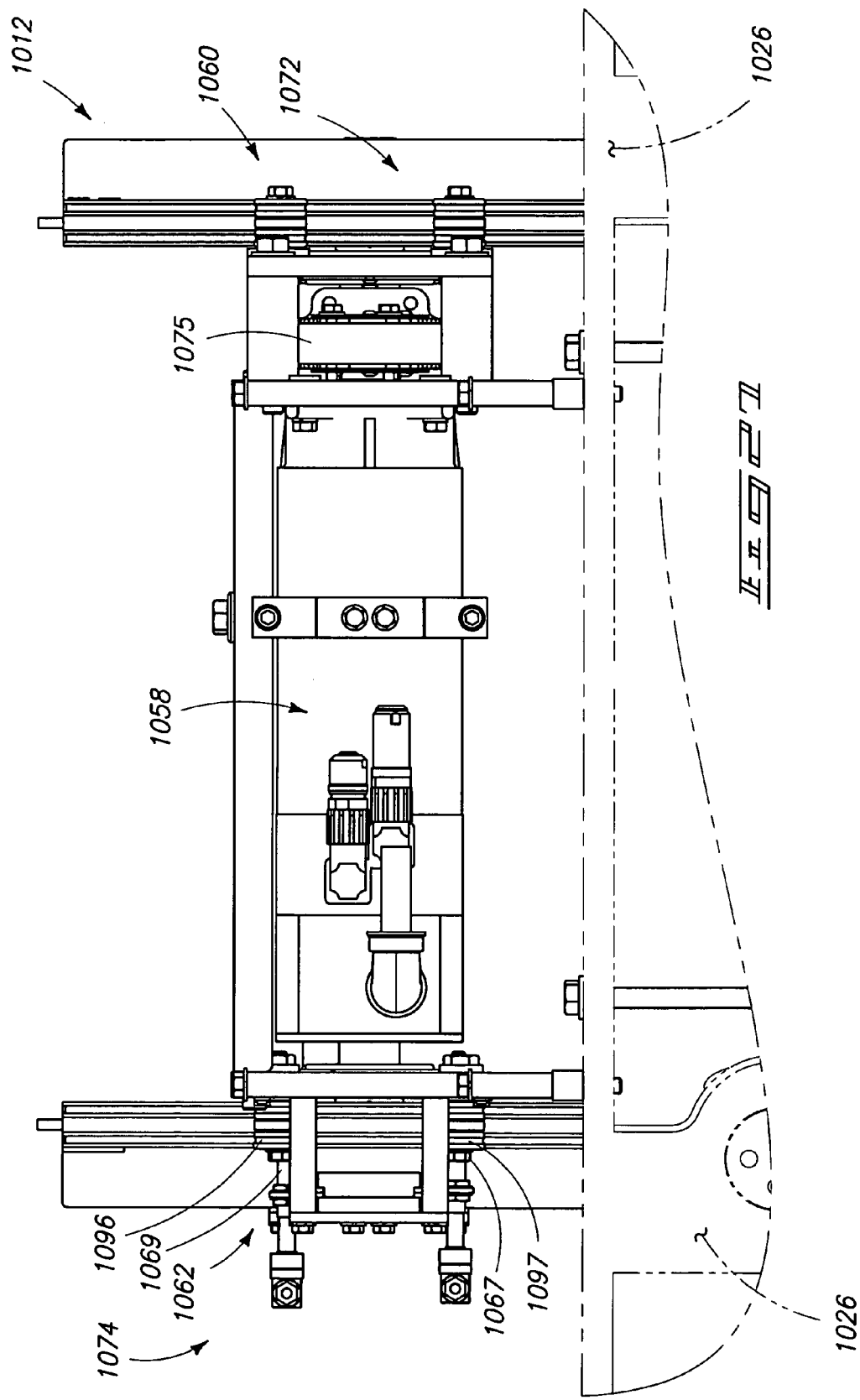
FIG. 27 is a plan view of the article ejector of FIGS. 20-26 as taken from a left side, or exit end, of FIG. 20.
Figure 28:
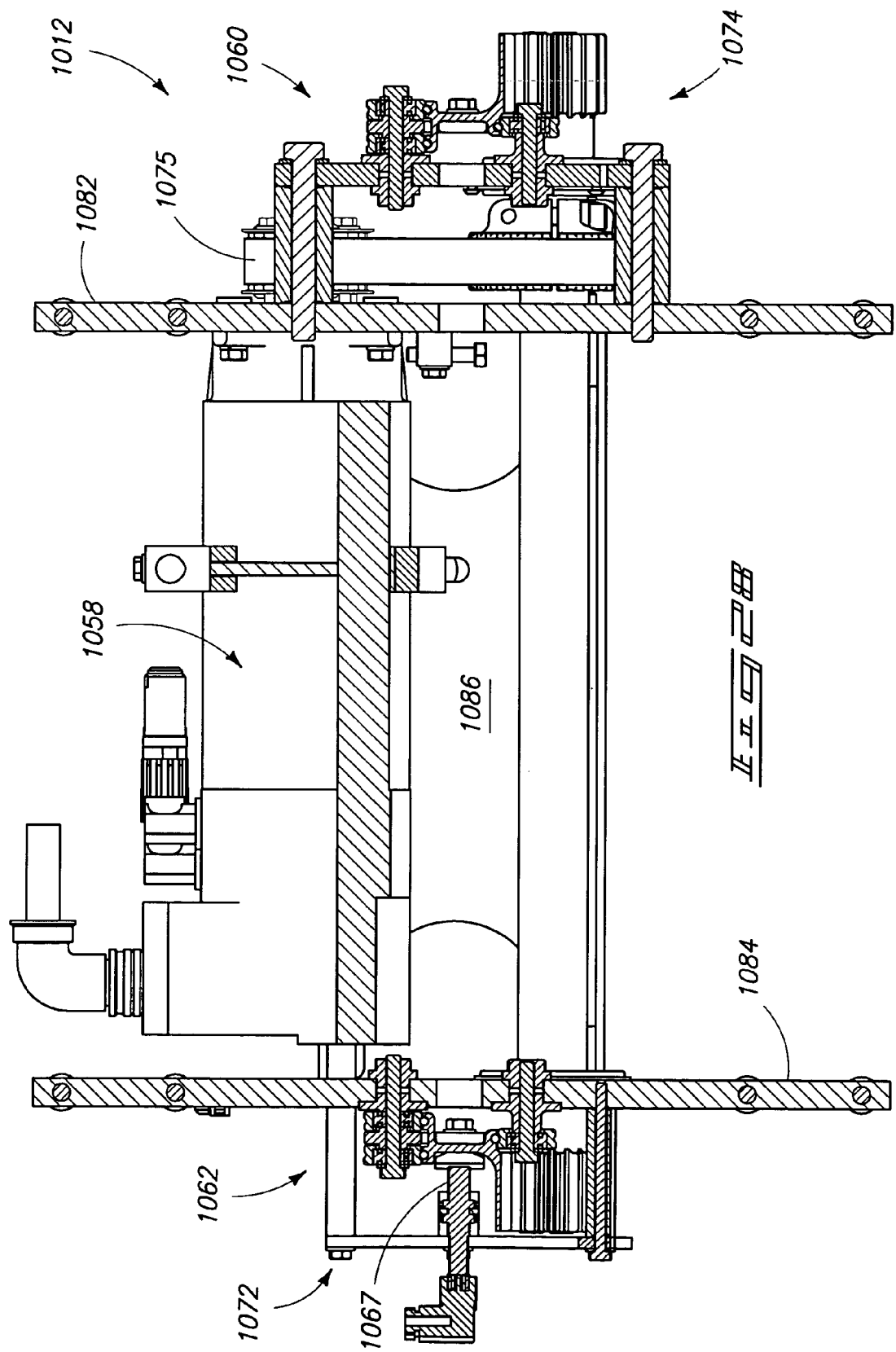
FIG. 28 is a sectional view taken along line 28-28 of FIG. 25 and further illustrating construction of the linear actuators and a sensor array of the article ejector.

As shown in FIG. 22, a mounting plate 1106 is affixed in spaced-apart relation with side plate 1084 via four bosses 1100-1103 via threaded fasteners 1108 that mate with a female threaded bore in an outer end of each boss 1100-1103. An opposite end of each boss 1100-1103 has a similar threaded female bore that receives a recessed-head fastener to retain each boss 1100-1103 onto side plate 1084. Plate 1106 supports sensors 1067 and 1079 via a pair of steel mounting brackets 1055 and 1057 which are clamped between a pair of aluminum clamp brackets 1049 and 1051 by tightening threaded fasteners 1049. Fasteners thread into female bores within bracket 1051 to draw together brackets 1055 and 1057, thereby locking brackets 1055 and 1057. An aperture is provided in an outer end of each bracket 1055 and 1057 into which each sensor 1069 and 1067, respectively, is secured using a pair of threaded nuts that engage threads about the sensor assembly. Each sensor 1055 and 1057 has a signal cable for delivering an output signal to the control system. Such signal cables have been omitted from the drawings to avoid obstructing the view of related mechanical components.

Slugs 1063 and 1065 are mounted to an outer vertical surface of rack 1066. For example, slug 1063 is mounted onto a steel base slug 1059 that is mounted onto rack 1066 using a pair of threaded, recessed fasteners that thread into bores in rack 1066. Slug 1063 has four bores that are used to affix slug 1066 onto slug 1059 using four threaded recessed fasteners 1061 that thread into complementary bores in slug 1059. Slug 1065 is mounted onto rack 1066 in a similar manner. In assembly, slugs 1063 and 1065 pass immediately adjacent to ends of sensors 1067 and 1069 which generates output signals indicative of positioning of rack 1066 relative to the platen. Hence, the control system can be used to synchronize and control positioning of the plungers of the ejector pin assembly.

Figure 20:
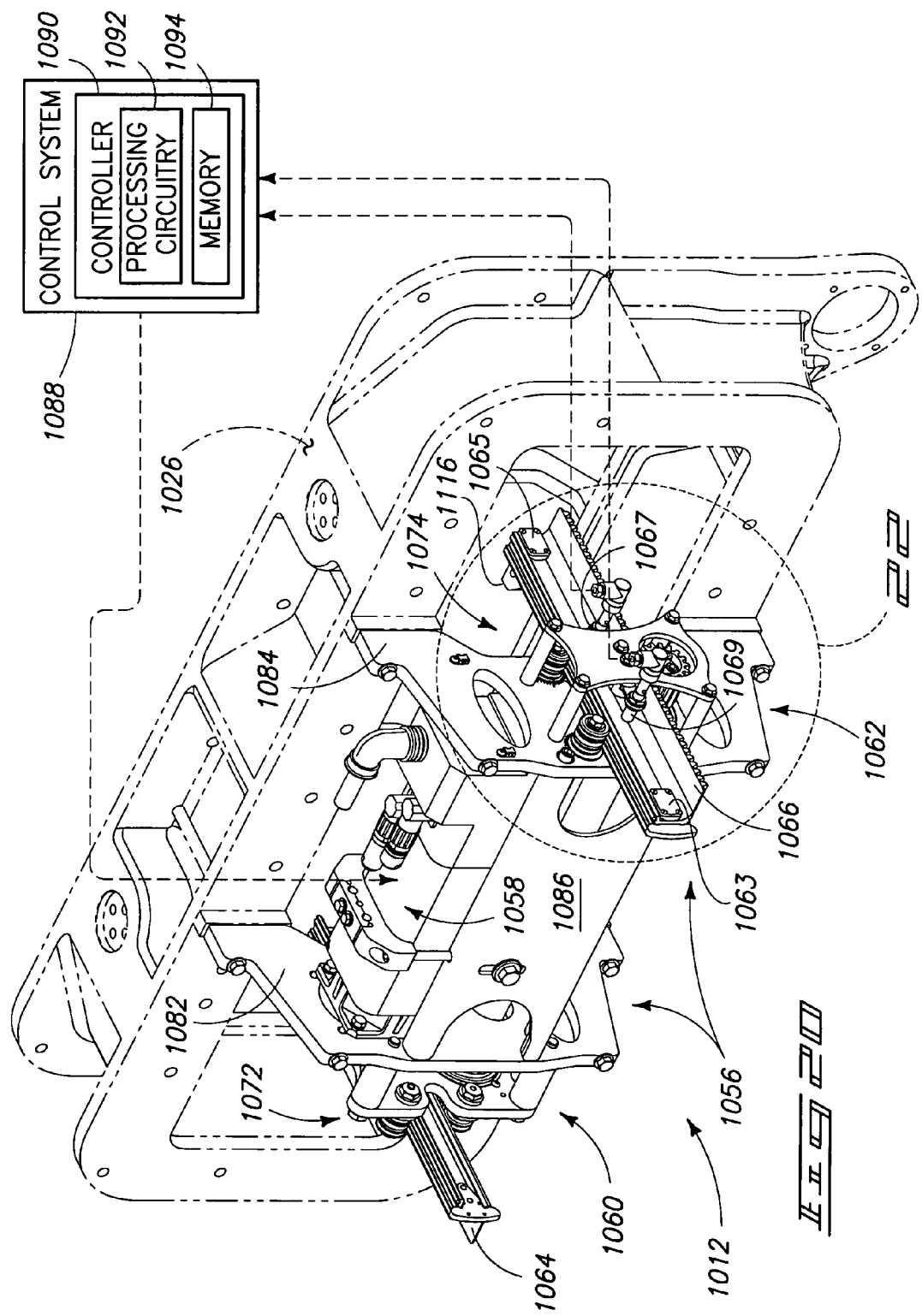
FIG. 20 is an enlarged perspective view of a second embodiment article ejector similar to the first embodiment article ejector depicted in FIG. 7 and usable on the trim press of FIGS. 1-4, and having a modified array of sensors for detecting positioning of article ejector components.
Figure 21:
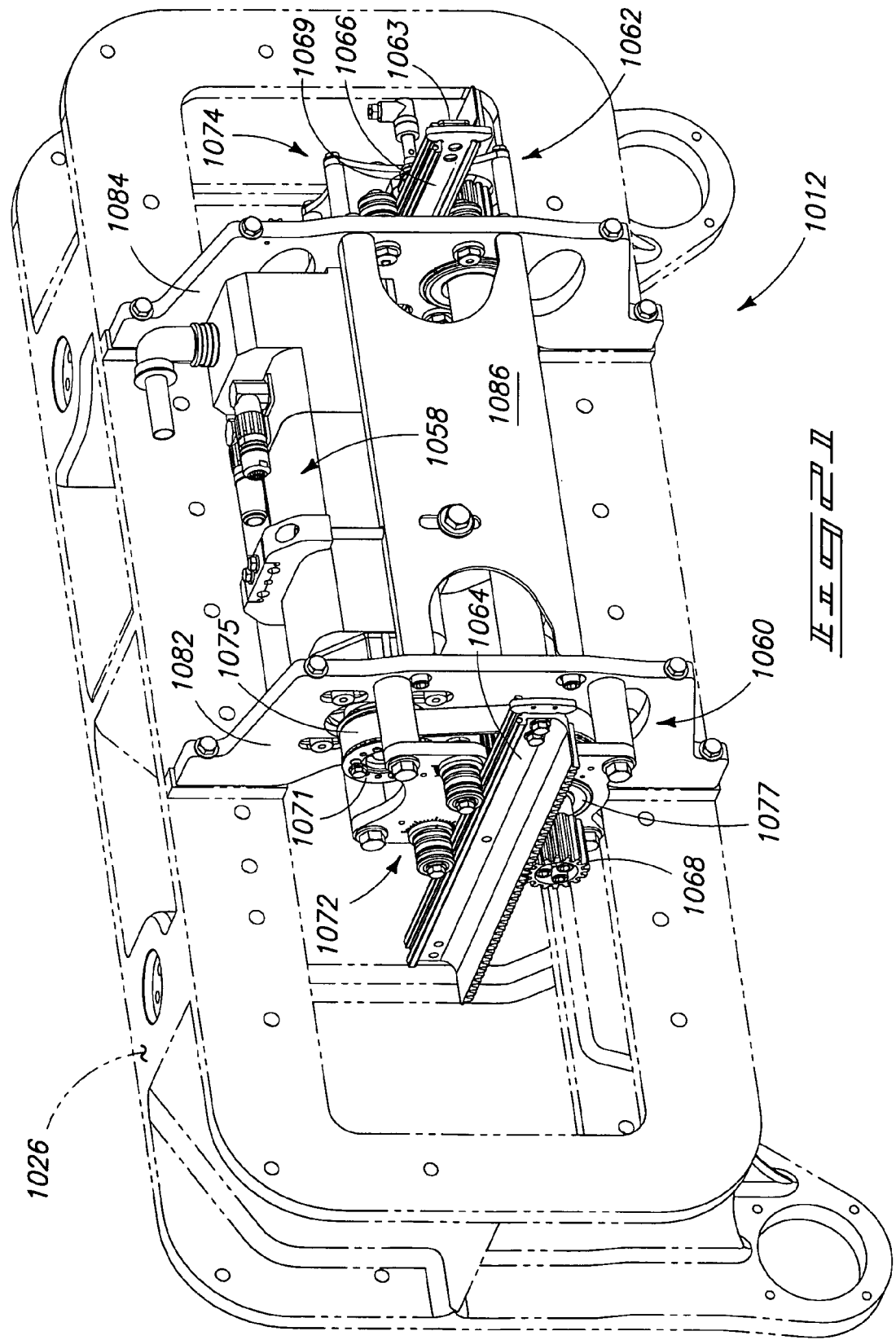
FIG. 21 is an enlarged perspective view of the second embodiment article ejector of FIG. 20, but taken from a view that is right-of-center of the view depicted in FIG. 20.

As shown in FIG. 20, control system 1088 is essentially the same as control system 88 (of FIG. 5). Control system 1088 is configured to receive an output signal from each of sensors 1067 and 1069 that identifies axial positioning of rack 1066 relative to platen 1026. This identified positioning is used by control system 1088 to identify and control positioning of ejector rods and plungers relative to a moving platen (as well as a stationary platen) of a trim press. Control system 88 (of FIG. 5) receives similar input signals, but they are not shown in FIG. 5 because the sensors are not visible in this view.

It is understood that the structural components in the two embodiments of FIGS. 1-19 and 20-28 are made from relatively lightweight materials, such as aluminum, where not otherwise indicated in order to reduce the moving mass of the overall article ejector and platen. However, other structural materials could be used in the alternative, such as steel, stainless steel, or composite materials.

Furthermore, numbered components in FIGS. 20-28 which have not been described herein match the descriptions for the components of the embodiment described in FIGS. 1-19, wherein the components for the embodiment of FIGS. 20-28 correspond with the numbers for the embodiment of FIGS. 1-19, except that each reference numeral has been incremented by 1000. For example, platen 26 (of FIGS. 1-19) corresponds with platen 1026 (of FIGS. 20-28).

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A trim press article ejector, comprising:
a support base:
a linear actuator carried by the base having at least one elongate rack and complementary pinion gear, the rack is supported for axial reciprocation via a linear raceway having teeth provided lengthwise along the rack, and wherein the pinion gear comprises complementary teeth configured to engage with the teeth on the rack;
at least one article ejector carried by the linear actuator for axial movement to-and-fro; and
a drive mechanism having a servo drive motor, the servo drive motor configured to rotate the pinion gear and configured to reciprocate the linear actuator to move the at least one article ejector to-and-fro; and
a pair of inductive electromagnetic sensors provided spaced apart on one of the rack and the base, and a ferrous element affixed to another of the rack and the base for each of the sensors and at a location detectable by the respective sensor and configured to detect an axial position of the at least one article ejector.

2. The trim press article ejector of claim 1, further comprising an ejector platen carried by the rack and configured to support the at least one article ejector.

3. The trim press article ejector of claim 1, further comprising a control system configured to controllably actuate the servo drive motor to controllably reciprocate the at least one article ejector.

4. The trim press article ejector of claim 1, wherein the linear actuator comprises a pair of elongate racks and complementary pinion gears provided in spaced-apart relation, the servo drive motor configured to rotate each pinion gear.

5. The trim press article ejector of claim 4, further comprising an ejector platen carried by the pair of elongate racks and operative to support the at least one article ejector.

6. The trim press article ejector of claim 5, wherein the linear actuator comprises two pairs of spaced-apart rollers carried by the support base, each pair provided along one of two side edges of the elongate rack to support the elongate rack for axial reciprocation.

7. The trim press article ejector of claim 6, wherein each roller in one pair of the rollers is supported on an eccentric mounting plate to adjust distance between the two pairs of spaced-apart rollers.

8. The trim press article ejector of claim 1, further comprising a control system configured to receive an output signal from each of the sensors indicative of a detected axial position of the at least one article ejector.

9. The trim press article ejector of claim 8, wherein the control system is configured to controllable actuate the servo drive motor to move the at least one article ejector to a desired axial position relative to the detected axial position.

10. A trim press, comprising:
    a frame:
    a stationary die platen:
    a moving die platen;
    an article ejector having a support base, a linear actuator carried by the support base, at least one article ejector, and a drive mechanism, wherein the linear actuator includes at least one elongate rack and complementary pinion gear configured to be driven by the drive mechanism, the article ejector is carried by the linear actuator for movement to-and-fro, and wherein the drive mechanism is configured to reciprocate the linear actuator to move the at least one article ejector to-and-fro; and
    a pair of inductive electromagnetic sensors provided spaced apart on one of the rack and the support base and a ferrous element affixed to another of the rack and the support base for interaction with at least one of the sensors and at a location detectable by the at least one of the sensors and configured to detect an axial position of the at least one article ejector.

11. The trim press of claim 10, wherein the drive mechanism comprises a servo drive motor.

12. The trim press of claim 11, wherein the article ejector comprises a plurality of ejector rods each terminating in an ejector paddle and carried by the at least one elongate rack for axial reciprocation to-and-fro to eject articles from within a trim press die on one of the stationary die platen and the moving die platen.

13. The trim press of claim 10, wherein the support base comprises a side plate affixed to the moving platen and a guide plate affixed to the side plate.

14. The trim press of claim 13, further comprising a controller configured to receive an output signal from the at least one position sensor indicative of detected linear positioning of the linear actuator and the at least one article ejector relative to the frame and generate an output signal responsive thereto to controllably operate the drive mechanism.

* * * * *

UNITED STATES PATENT AND TRADEMARK OFFICE
CERTIFICATE OF CORRECTION

PATENT NO. : 7,559,759 B2  Page 1 of 1
APPLICATION NO. : 11/186725
DATED : July 14, 2009
INVENTOR(S) : Vantrease It is certified that error appears in the above-identified patent and that said Letters Patent is hereby corrected as shown below:

Column 7, Line 42 – Replace "fitting 10" with --fitting 110--.

Signed and Sealed this

Thirty-first Day of August, 2010

David J. Kappos
*Director of the United States Patent and Trademark Office*